(12) United States Patent  
Kawabe

(10) Patent No.: US 7,907,788 B2
(45) Date of Patent: *Mar. 15, 2011

(54) RESOLUTION CONVERSION METHOD

(75) Inventor: Toru Kawabe, Hachioji (JP)

(73) Assignee: Konica Minolta Business Technologies, Inc. (JP)

(*) Notice: Subject to any disclaimer, the term of this patent is extended or adjusted under 35 U.S.C. 154(b) by 0 days.

This patent is subject to a terminal disclaimer.

(21) Appl. No.: 12/498,255

(22) Filed: Jul. 6, 2009

(65) Prior Publication Data

US 2010/0008596 A1  Jan. 14, 2010

(30) Foreign Application Priority Data

Jul. 14, 2008 (JP) ................................. 2008-183182

(51) Int. Cl.
G06K 9/40 (2006.01)

(52) U.S. Cl. ......... 382/266; 382/276; 382/298; 382/300

(58) Field of Classification Search .................. 382/266, 382/276, 298, 300
See application file for complete search history.

(56) References Cited

U.S. PATENT DOCUMENTS

| | | | | |
|---|---|---|---|---|
| 5,848,198 A | * | 12/1998 | Penn | 382/276 |
| 6,289,137 B1 | * | 9/2001 | Sugiyama et al. | 382/299 |
| 7,010,176 B2 | * | 3/2006 | Kusunoki | 382/299 |
| 7,046,862 B2 | * | 5/2006 | Ishizaka et al. | 382/298 |
| 7,254,282 B2 | * | 8/2007 | Sathyanarayana | 382/300 |

FOREIGN PATENT DOCUMENTS

| | | |
|---|---|---|
| JP | 05-040825 | 2/1993 |
| JP | 05-219360 | 8/1993 |
| JP | 2006-270767 | 10/2006 |

* cited by examiner

*Primary Examiner* — Bhavesh M Mehta
*Assistant Examiner* — Stephen R Koziol
(74) *Attorney, Agent, or Firm* — Squire, Sanders & Dempsey (US) LLP

(57) ABSTRACT

Disclosed is a resolution conversion method, which makes it possible not only to acquire a diagonal edge that is smoothed without causing any unevenness all over the image, but also to stably reproduce a thin line having a thickness corresponding to its original thickness, irrespective of an integer multiple or a non-integer multiple of the magnification factor to be employed for enlarging an original image, when the high-resolution conversion processing is applied to a binary image represented in the dot-matrix format. An operation for integrating the interpolation value with respect to the area of the input pixel is implemented after the output pixel area is shifted in a horizontal direction and/or a vertical direction so as to make the output pixel area depart from a center of the interpolation area, when the output pixel area is included in a single interpolation area in the horizontal direction and/or a vertical direction.

12 Claims, 21 Drawing Sheets

○ PIXEL POSITION OF INPUT IMAGE
● PIXEL POSITION OF OUTPUT IMAGE

RESOLUTION CONVERSION METHOD

This application is based on Japanese Patent Application NO. 2008-183182 filed on Jul. 14, 2008, with Japan Patent Office, the entire content of which is hereby incorporated by reference.

BACKGROUND OF THE INVENTION

The present invention relates to a resolution conversion method for converting a resolution of a binary image represented in the dot-matrix format.

In the technical field of the resolution conversion of an image, the liner interpolating method (for instance, set forth in Tokkaihei 5-219360, Japanese Non-Examined Patent Publication) and the area averaging method (for instance, set forth in Tokkaihei 5-40825 and Tokkai 2006-270707, both Japanese Non-Examined Patent Publication) are generally employed for this purpose. With respect to the binary image, after the resolution conversion processing is completed, the binarizing processing is further applied to each of the pixels included in the image concerned, by comparing densities and threshold values of the pixels with each other.

FIG. 14 shows a schematic diagram indicating appropriate application ranges of the liner interpolating method, the area averaging method, etc. Generally speaking, although an interpolating method, such as the liner interpolating method, etc., is employed for acquiring a high resolution image (size enlargement) and a slightly low resolution image (size reduction), there has been a problem that jaggies are liable to emerge in the reproduced image when the interpolating method is employed for performing an excessively low resolution processing to such an extent that the image size is heavily reduced on a scale of one to several. To avoid such the problem, the area averaging method has been usually employed only for acquiring a low resolution image (size reduction). On the other hand, although the area averaging method is beneficial for acquiring a low resolution image, an effect of the edge smoothing operation in which the high resolution property is effectively utilized becomes insufficient when the area averaging method is employed for acquiring the high resolution image.

Accordingly, there has been considered such a method including the steps of: converting the original binary image to the multi-value image by applying an interpolating processing, such as the liner interpolation processing, etc.; and applying the area averaging to the multi-value image ((interpolation+area averaging) method). According to the abovementioned method, since the problems residing in both the interpolating method and the area averaging method can be complemented with each other, it is possible to acquire a resolution converted image, serving as a high quality image to some extent, without depending on the magnification factor over the high to low resolution conversion processing.

FIG. 15 shows a flowchart indicating a resolution conversion processing flow of a binary image according to the (interpolation+area averaging) method. Initially, the binary image represented in the dot-matrix format is converted to the multi value image by repeatedly finding a density value (interpolation value) at an arbitral position between two pixels of the binary image for every pixel included in the binary image (Step S301). Successively, a density value of each pixel to be included in the output image is found by performing the operation for re-sampling the multi-value image, while employing the area averaging method (Step S302). Then, each of output pixels is binarized by comparing the density value, found in the above, with a predetermined threshold value so as to determine 0 or 1 corresponding to small or large (Step S303).

For instance, as shown in FIG. 16, an input image 311 and an output image 312 are correlated with each other by superimposing them with each other so as to make the pixels positioned at the four corners of the input image 311 and the other pixels positioned at the four corners of the output image 312 coincide with each other, and then, the total area of the output image 312 is equally divided by the number of output pixels, so as to allot an image area G to each of the pixels of the output image 312. In this connection, hereinafter, the center position of the image area G is defined as a coordinate position representing the image area G concerned (area represented coordinate; pixel position).

In the abovementioned example, the following assumptions are fulfilled:
1) setting a pixel area (specified by a coordinate area in both a horizontal direction and a vertical direction) so as to make it correspond to a rectangular area occupied by each of pixels;
2) setting a coordinate area No. k at a coordinate value in a range of (k−0.5)-(k+0.5);
3) setting a represented coordinate of the coordinate area No. k at value k serving as the center value of the coordinate area;
4) setting the image area as the rectangular area having apexes, each of which is a center of each of four pixels residing at four corners of the image area concerned; and
5) applying the assumptions for the output image to those of the input image as well.

Further, as shown in FIG. 17, the pixels of the input image 311 correspond to those of the output image 312, so that the centers of four pixels positioned at four corners of the input image 311 coincide with those of the output image 312.

When multiplying the resolution with the non-integer magnification factor, a phase relationship between each of the pixels of the input image and each of the pixels of the output image varies depending on its current position. For instance, when multiplying the resolution with the magnification factor of 205%, which is slightly shifted from a double size of the input image, the change between the phase relationship shown in FIG. 18 and the other phase relationship shown in FIG. 19 alternately emerges with a long time period. In this connection, in both FIG. 18 and FIG. 19, white circles indicate white pixels, black solid circles indicate black pixels, small-sized gray solid circles indicate output pixels, and a rectangular area, written in broken lines and surrounding each of the output pixels, indicates each of pixel areas (integration region) in regard to a corresponding one of the output pixels.

At each of the positions having the phase relationship shown in FIG. 18, a plurality of pixels (peripheral four output pixels), which are uniformly influenced by a value of a specific pixel included in the input image, are generated around the peripheral area of the specific pixel. Concretely speaking, the four output pixels (indicated by the small-sized gray solid circles) residing around the peripheral area of a black input pixel B are made to be black by strongly receiving the influence of the black input pixel B positioned at the center of the four output pixels, while the other four output pixels residing around the peripheral area of a white input pixel W are made to be white by strongly receiving the influence of the white input pixel W positioned at the center of the four output pixels concerned. Accordingly, since a single input pixel is merely replaced by four output pixels, it is impossible to smooth the edge of the diagonal, as shown in FIG. 20, resulting in a difficulty of acquiring the effect of the high resolution processing.

On the other hand, at each of the positions having the phase relationship shown in FIG. 19, the pixel area, to which hatched lines are not applied, is strongly influenced by a specific input pixel (input pixel positioned at a center of the pixel area of the output pixel concerned). Accordingly, if the specific input pixel is white, the concerned pixel area is securely made to be white, while if the specific input pixel is black, the concerned pixel area is securely made to be black, resulting in the stable binarizing processing. On the other hand, the other pixel area, to which hatched lines are applied, is uniformly influenced by the peripheral input pixels without depending on the specific input pixel (for instance, an image area 331 is uniformly influenced by both a black input pixel 332 and a white input pixel 333, when viewing them in the vertical direction). Accordingly, the density value derived by normalizing the integration value is liable to approach the threshold value, and as a result, when performing the binarizing processing, the operation for determining whether the concerned pixel area is made to be white or black is liable to become unstable. Therefore, according to such the phase relationship shown in FIG. 19, there would occur such the phenomenon that the line thickness of the diagonal discontinuously becomes thick or thin as shown in FIG. 21.

Further, depending on the phase relationship between the input pixel and the output pixel, the edge of the diagonal is appropriately smoothed.

As mentioned in the foregoing, since the phase relationship between the input pixel and the output pixel gradually varies within a single sheet of image when the high resolution multiplying operation with a non-integer magnification factor is applied, there has been such a problem that unevenness is generated in the smoothing state of the edge of the diagonal.

Further, when the high resolution multiplying operation with an integer magnification factor is applied, there has been another problem that the tendency shown in any one of FIG. 18 or FIG. 19 emerges all over the image.

SUMMARY OF THE INVENTION

To overcome the abovementioned drawbacks in the conventional resolution conversion methods, it is one of objects of the present invention to provide a resolution conversion method, which makes it possible not only to acquire a diagonal edge image that is fairly smoothed without causing any unevenness all over the image, but also to stably reproduce a thin line having a thickness corresponding to its original thickness, irrespective of an integer multiple or a non-integer multiple of the magnification factor to be employed for enlarging an original image, when the high-resolution conversion processing is applied to a binary image represented in the dot-matrix format.

Accordingly, at least one of the objects of the present invention can be attained by any one of the resolution conversion methods and the computer readable storage mediums described as follows.

(1) According to a resolution conversion method reflecting an aspect of the present invention, the resolution conversion method for converting a resolution of an input image, which is a binary image represented in a dot-matrix format, has: representing a density at a specific point, located at an arbitral position residing between pixels included in the input image, as an interpolation value of an adjacent pixel located adjacent to the specific point within the input image; allotting an output pixel area, which serves as a pixel area of each of output pixels to be included in an output image acquired after a resolution conversion processing is completed, to each of the output pixels in such a state that the input image and the output image are superimposed with each other so that four corners of the input image and those of the output image respectively correspond to each other; and determining binary data of each of the output pixels by comparing a normalized value that is acquired by normalizing a value derived by integrating the interpolation value with respect to an area of an input pixel, which is superimposed with the output pixel area, in reference to the output pixel area, with a predetermined threshold value to determine small and large between them;

wherein an operation for integrating the interpolation value with respect to the area of the input pixel is implemented after: when the output pixel area is included in a single interpolation area in a horizontal direction, the output pixel area is shifted in the horizontal direction so as to make the output pixel area depart from a center of the interpolation area; and when the output pixel area is included in a single interpolation area in a vertical direction, the output pixel area is shifted in the vertical direction so as to make the output pixel area depart from a center of the interpolation area.

(2) According to a resolution conversion method reflecting another aspect of the present invention, the resolution conversion method for converting a resolution of an input image, which is a binary image represented in a dot-matrix format, has: representing a density at a specific point, located at an arbitral position residing between pixels included in the input image, as an interpolation value of an adjacent pixel located adjacent to the specific point within the input image; establishing input pixel areas at centers of which input pixels included in the input image are positioned, respectively; allotting an output pixel area, which serves as a pixel area of each of output pixels to be included in an output image acquired after a resolution conversion processing is completed, to each of the output pixels in such a state that the input image and the output image are superimposed with each other so that four corners of the input image and those of the output image respectively correspond to each other; and determining binary data of each of the output pixels by comparing a normalized value that is acquired by normalizing a value derived by integrating the interpolation value with respect to an area of an input pixel, which is superimposed with the output pixel area, in reference to the output pixel area, with a predetermined threshold value to determine small and large between them;

wherein an operation for integrating the interpolation value with respect to the area of the input pixel is implemented after: when the output pixel area crosses over plural input pixel areas in a horizontal direction, the output pixel area is shifted in the horizontal direction so as to make the output pixel area approach one of the centers of the input pixel areas; and when the output pixel area crosses over plural input pixel areas in a vertical direction, the output pixel area is shifted in the vertical direction so as to make the output pixel area approach one of the centers of the input pixel areas.

(3) According to still another aspect of the present invention, in the resolution conversion method recited in item 1 or item 2, the input image and the output image are superimposed with each other in such a manner that a center of a pixel area of a pixel positioned at an edge portion of the output image is shifted in both the horizontal direction and the vertical direction from that of the input image by a minutely small distance.

(4) According to still another aspect of the present invention, in the resolution conversion method recited in item 3, the minutely small distance is set at a value that is smaller than a half of a pitch of pixels included in the output image.

(5) According to a computer readable storage medium reflecting still another aspect of the present invention, the computer readable storage medium stores a computer executable program for implementing an operation for converting a resolution of an input image, which is a binary image represented in a dot-matrix format, the program being executable by a computer to cause the computer to perform a process having: representing a density at a specific point, located at an arbitral position residing between pixels included in the input image, as an interpolation value of an adjacent pixel located adjacent to the specific point within the input image; allotting an output pixel area, which serves as a pixel area of each of output pixels to be included in an output image acquired after a resolution conversion processing is completed, to each of the output pixels in such a state that the input image and the output image are superimposed with each other so that four corners of the input image and those of the output image respectively correspond to each other; and determining binary data of each of the output pixels by comparing a normalized value that is acquired by normalizing a value derived by integrating the interpolation value with respect to an area of an input pixel, which is superimposed with the output pixel area, in reference to the output pixel area, with a predetermined threshold value to determine small and large between them;

wherein an operation for integrating the interpolation value with respect to the area of the input pixel is implemented after: when the output pixel area is included in a single interpolation area in a horizontal direction, the output pixel area is shifted in the horizontal direction so as to make the output pixel area depart from a center of the interpolation area; and when the output pixel area is included in a single interpolation area in a vertical direction, the output pixel area is shifted in the vertical direction so as to make the output pixel area depart from a center of the interpolation area.

(6) According to a computer readable storage medium reflecting still another aspect of the present invention, the computer readable storage medium stores a computer executable program for implementing an operation for converting a resolution of an input image, which is a binary image represented in a dot-matrix format, the program being executable by a computer to cause the computer to perform a process having: representing a density at a specific point, located at an arbitral position residing between pixels included in the input image, as an interpolation value of an adjacent pixel located adjacent to the specific point within the input image; establishing input pixel areas at centers of which input pixels included in the input image are positioned, respectively; allotting an output pixel area, which serves as a pixel area of each of output pixels to be included in an output image acquired after a resolution conversion processing is completed, to each of the output pixels in such a state that the input image and the output image are superimposed with each other so that four corners of the input image and those of the output image respectively correspond to each other; and determining binary data of each of the output pixels by comparing a normalized value that is acquired by normalizing a value derived by integrating the interpolation value with respect to an area of an input pixel, which is superimposed with the output pixel area, in reference to the output pixel area, with a predetermined threshold value to determine small and large between them;

wherein an operation for integrating the interpolation value with respect to the area of the input pixel is implemented after: when the output pixel area crosses over plural input pixel areas in a horizontal direction, the output pixel area is shifted in the horizontal direction so as to make the output pixel area approach one of the centers of the input pixel areas; and when the output pixel area crosses over plural input pixel areas in a vertical direction, the output pixel area is shifted in the vertical direction so as to make the output pixel area approach one of the centers of the input pixel areas.

(7) According to still another aspect of the present invention, in the resolution conversion method recited in item 5 or item 6, the input image and the output image are superimposed with each other in such a manner that a center of a pixel area of a pixel positioned at an edge portion of the output image is shifted in both the horizontal direction and the vertical direction from that of the input image by a minutely small distance.

(8) According to still another aspect of the present invention, in the resolution conversion method recited in item 7, the minutely small distance is set at a value that is smaller than a half of a pitch of pixels included in the output image.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE PREFERRED EMBODIMENT

Figure 1:
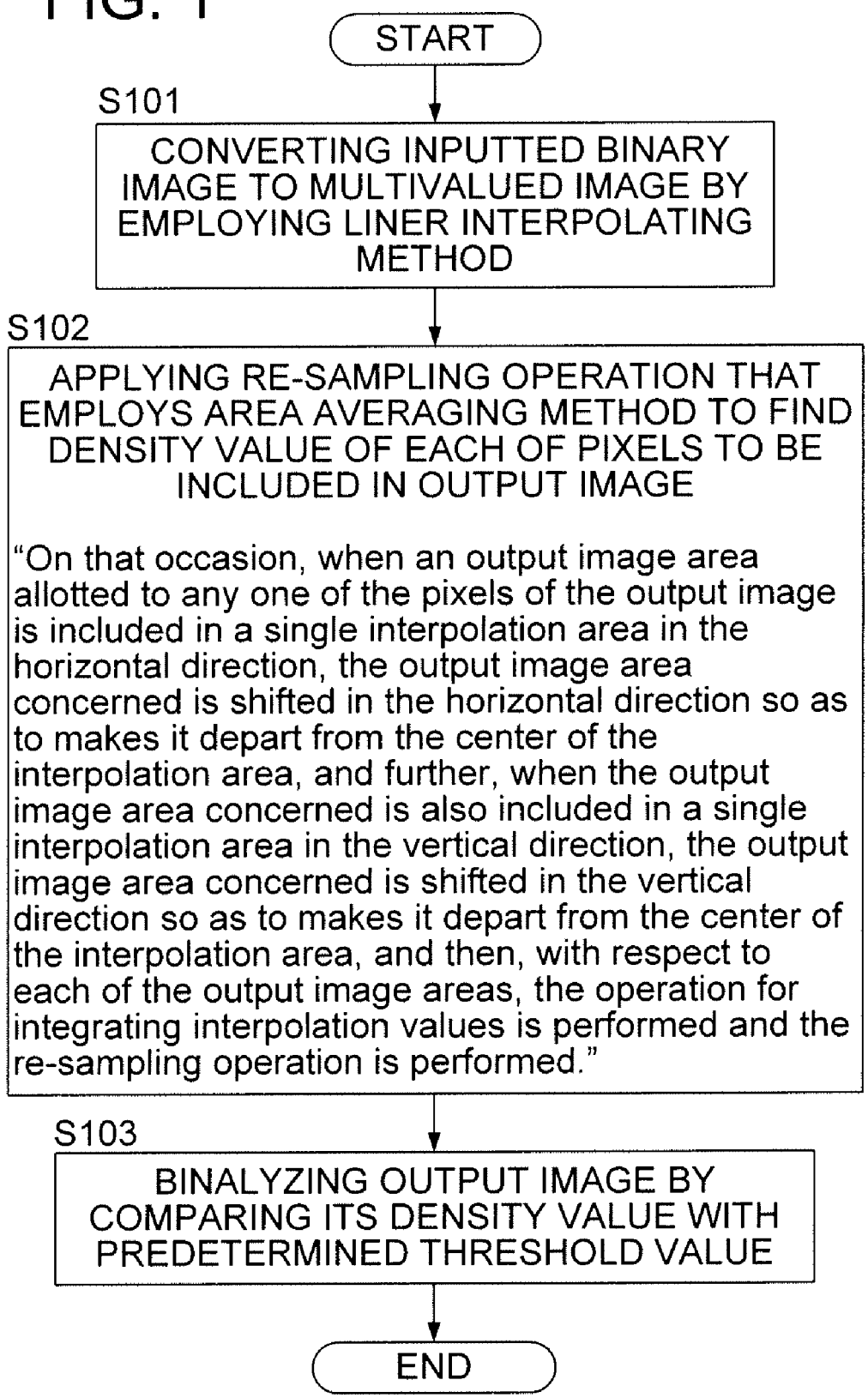
FIG. 1 shows a flowchart roughly indicating an overall processing flow of a resolution conversion method embodied in the present invention as the first embodiment.

Referring to the drawings, the preferred embodiments of the present invention will be detailed in the following.

First Embodiment

Figure 15:
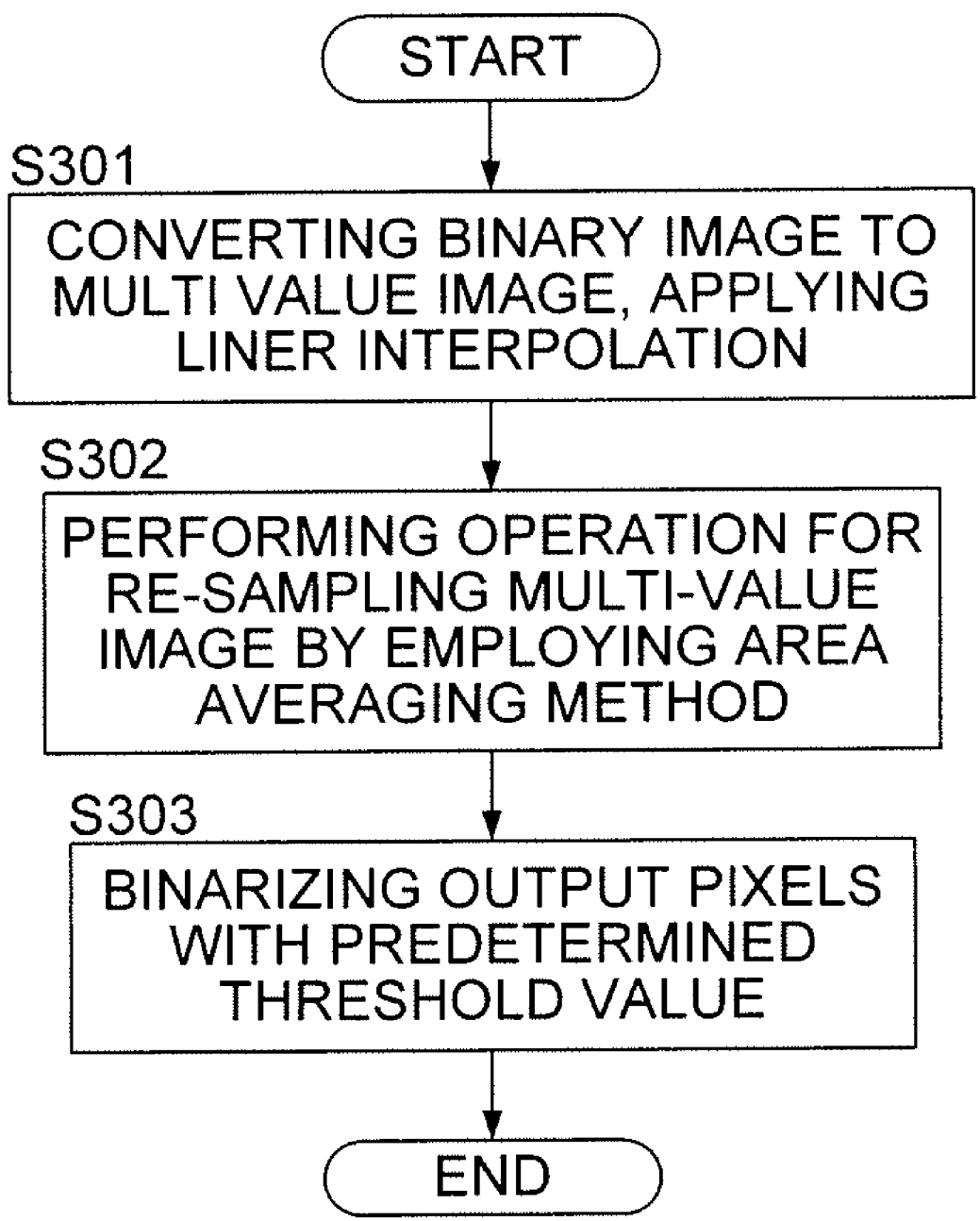
FIG. 15 shows a flowchart indicating a resolution conversion processing flow of a binary image according to the (interpolation+area averaging) method.

FIG. 1 shows a flowchart roughly indicating an overall processing flow of the resolution conversion method embodied in the present invention as the first embodiment. Although the processing flow shown in FIG. 1 is fundamentally the same as that described in the "BACKGROUND OF THE INVENTION" referring to FIG. 15, the processing flow shown in FIG. 1 is different from that indicated in FIG. 15 on the point that, when an output pixel area (pixel area of the output pixel) is included in a single interpolation area with respect to each of the horizontal direction and the vertical direction, an operation for integrating interpolation values is performed after the output pixel area is made to be shifted.

Initially, a density value (interpolation value) at an arbitral position between pixels of the input image, serving as the inputted binary image represented in the dot-matrix format, is found by employing the liner interpolating method, so as to convert the inputted binary image to the multivalued image (Step S101).

Figure 16:
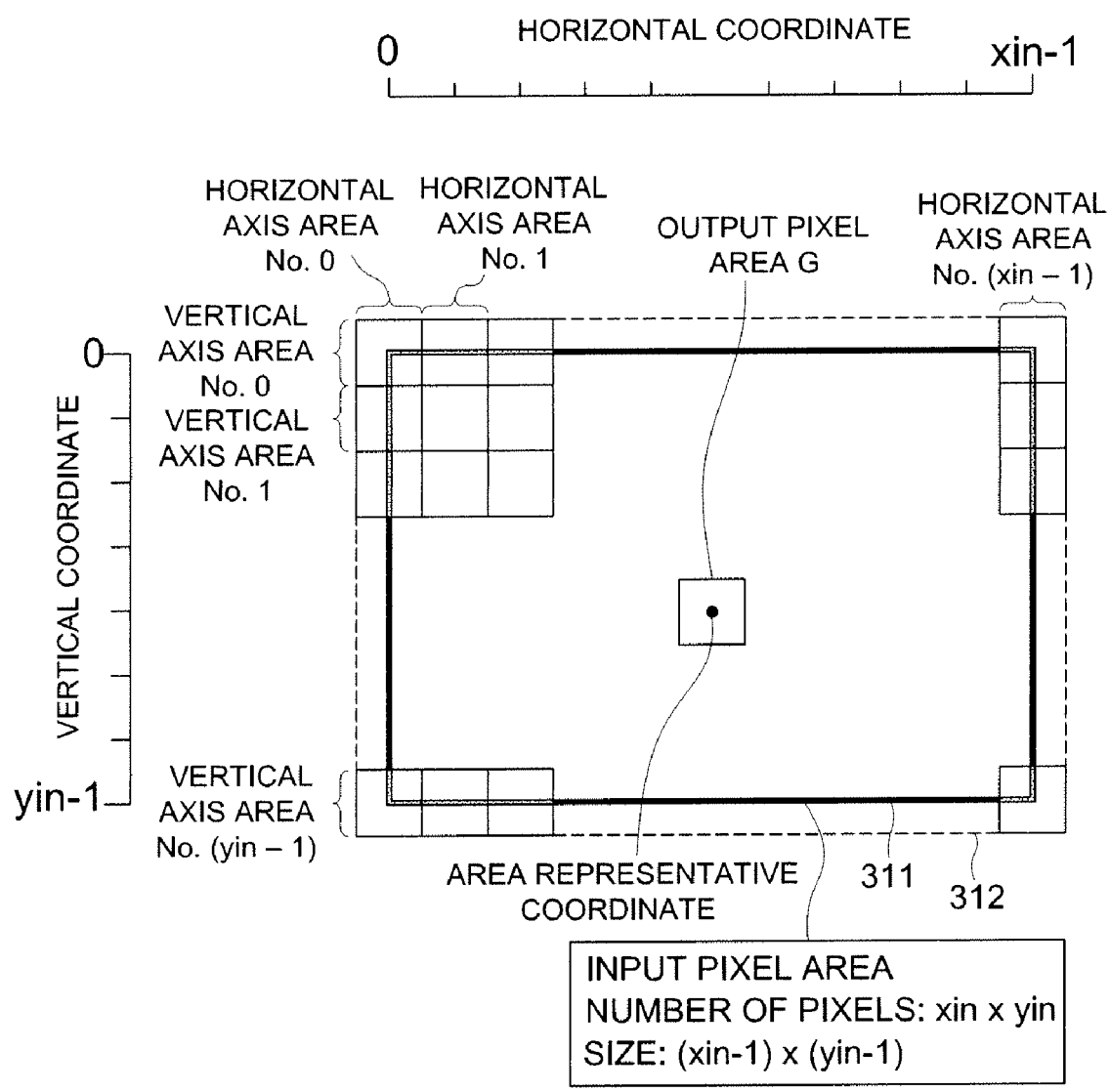
FIG. 16 shows an explanatory schematic diagram indicating a positional relationship between an image and a coordinate, when an input image and an output image are superimposed with each other so as to make centers of pixels positioned at four corners of an input image and those of an output image coincide with each other.
Figure 17:
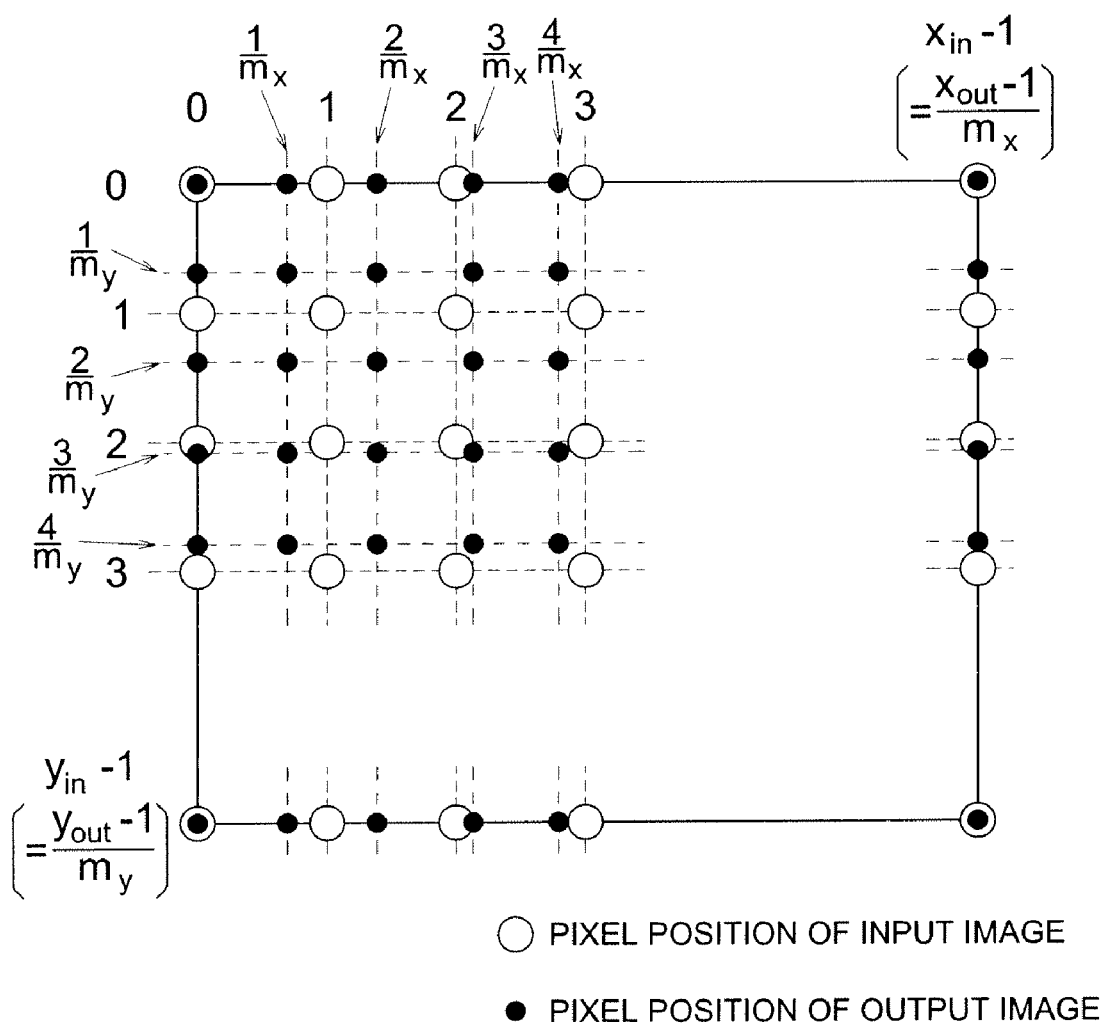
FIG. 17 shows an explanatory schematic diagram indicating such an exemplary state that an input image and an output image are superimposed with each other so as to make centers of pixels positioned at four corners of an input image and those of an output image coincide with each other.
Figure 18:
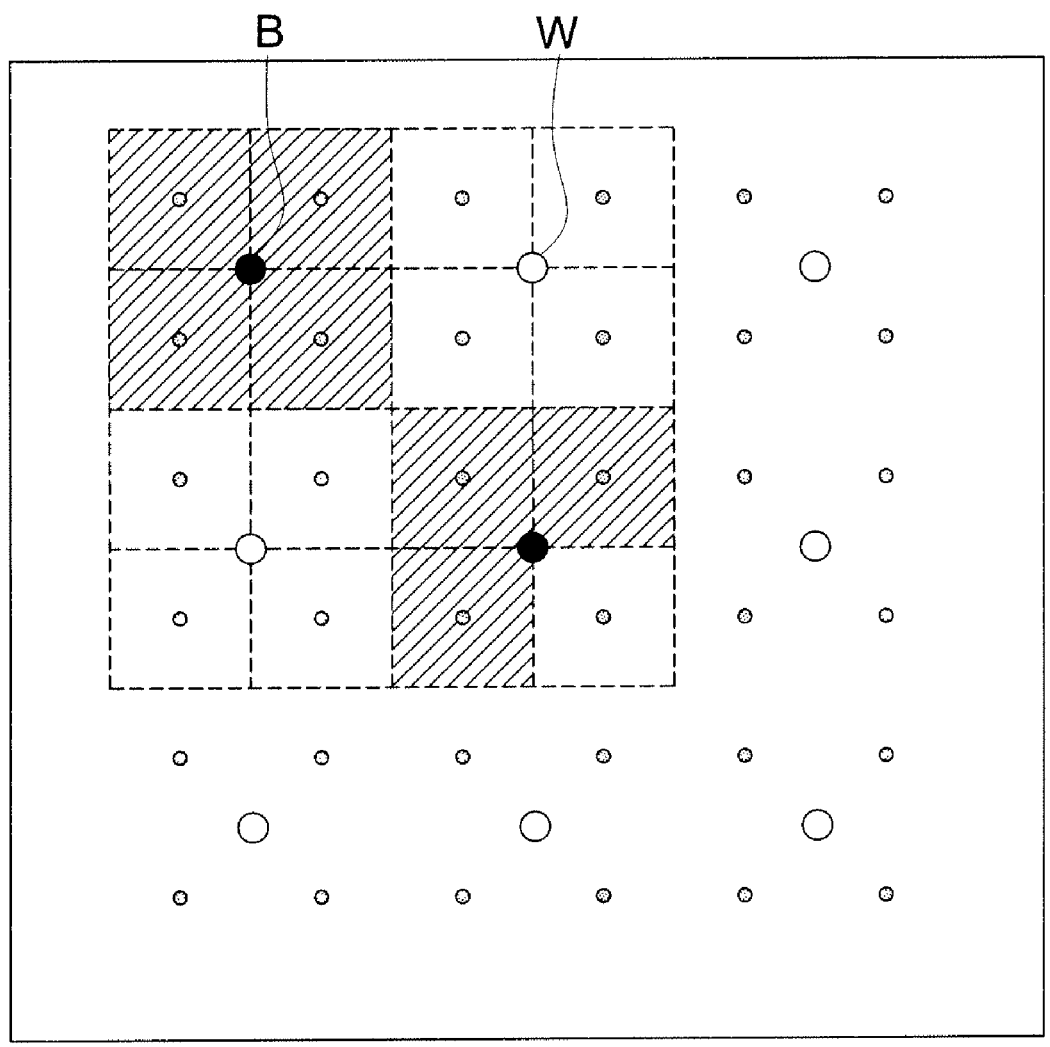
FIG. 18 shows an explanatory schematic diagram indicating a phase relationship between input pixels and output pixels, when the magnification factor of 205%, which is slightly shifted from a double size of an input image, is employed for multiplying a resolution.

Successively, a density value of each of the pixels to be included in the output image is found by applying the re-sampling operation that employs the area averaging method (Step S102). On that occasion, as indicated in the schematic diagrams shown in FIG. 16 and FIG. 17, the input image and the output image are superimposed with each other so as to make the centers of the pixels positioned at the four corners of the input image and those of the pixels positioned at the four corners of the resolution-converted output image coincide (correspond) with each other, and then, the output image area, serving as the initial image area, is allotted to each of the pixels to be included in the output image.

After that, when an output image area allotted to any one of the pixels of the output image is included in a single interpolation area in the horizontal direction, the output image area concerned is shifted in the horizontal direction so as to makes it depart from the center of the interpolation area, and further, when the output image area concerned is also included in a single interpolation area in the vertical direction, the output image area concerned is shifted in the vertical direction so as to makes it depart from the center of the interpolation area, and then, with respect to each of the output image areas, the operation for integrating interpolation values is performed and the re-sampling operation is performed.

Still successively, each of the pixels included in the output image is binarized by comparing its density value, determined by the re-sampling operation performed in the above, with a predetermined threshold value so as to determine 0 or 1 corresponding to small or large (Step S103).

Next, the liner interpolating operation and the re-sampling operation to be performed in the abovementioned processing will be further detailed in the following.

Figure 2:
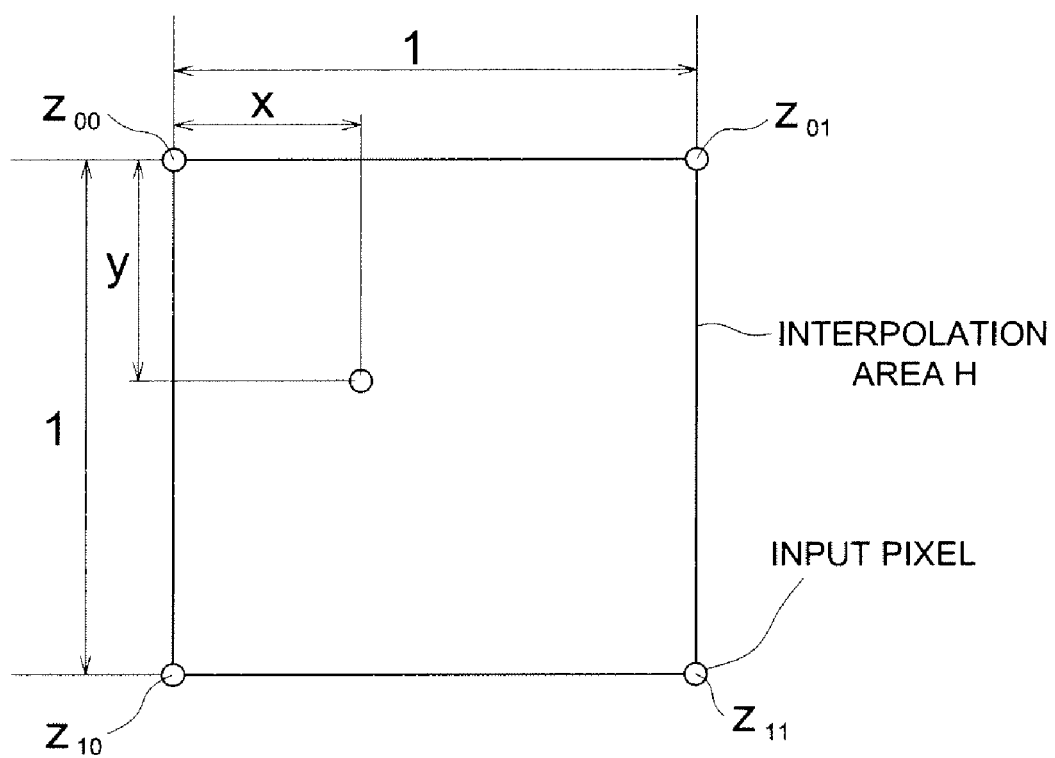
FIG. 2 shows an explanatory schematic diagram indicating an interpolation area.

At first, the liner interpolating operation is performed in Step S101 by setting the rectangular area having apexes, which are four adjacent pixels within the input image (four input pixels), as an interpolation area. As shown in FIG. 2, an interpolation area H is represented by the square area whose size is 1×1 in the scale setting a pitch of input pixels as the unit of dimension.

When data values of the input pixels are represented by $z_{00}$, $z_{01}$, $z_{10}$, $z_{11}$, an interpolation value "z" in the relative coordinate (x, y) within the interpolation area is represented by Equation (1) indicated as follow.

$$z=(1-x)(1-y)z_{00}+x(1-y)z_{01}+(1-x)yz_{10}+xyz_{11}$$

$$0 \leq x, y \leq 1$$

$$z_{00}, z_{01}, z_{10}, z_{11} = \text{'0' or '1'} \qquad \text{Equation (1)}$$

Figure 3:
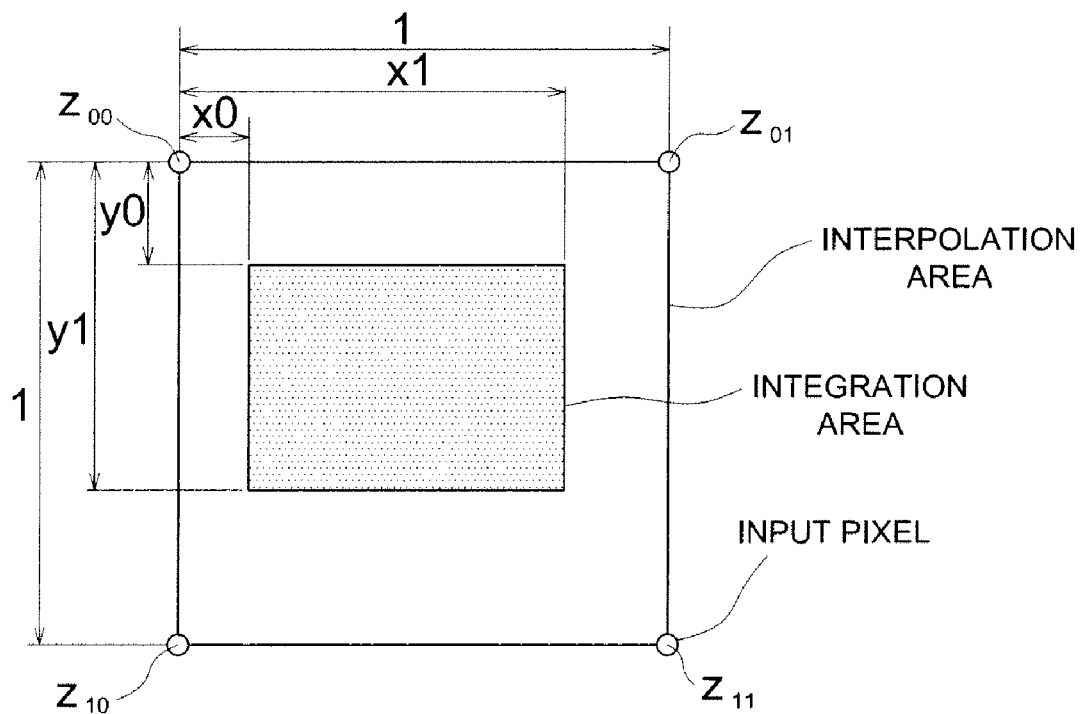
FIG. 3 shows an explanatory schematic diagram indicating an integration area within an interpolation area.

Further, the integration value of the interpolation value corresponding to the arbitral rectangular area residing within the interpolation area (integration area, refer to FIG. 3) is represented by Equation (2) indicated as follow.

$$\int_{y_0}^{y_1}\int_{x_0}^{x_1} z = \left[(x_1-x_0)(y_1-y_0)\left\{\begin{array}{l}(z_{00}-z_{01}-z_{10}+z_{11})\dfrac{(x_0+x_1)(y_0+y_1)}{4}+\\ \dfrac{(z_{10}-z_{00})(y_0+y_1)}{2}+\\ \dfrac{(z_{01}-z_{00})(x_0+x_1)}{2}+z_{00}\end{array}\right\}\right] \qquad \text{Equation (2)}$$

when $x_0 = 0$, $x_1 = 1$, $y_0 = 0$, $y_1 = 1$ $(z_{00} + z_{01} + z_{10} + z_{11})/4$ Next, the operation for shifting the output image area, to be performed in Step S102 abovementioned, will be further detailed in the following.

Figure 4:
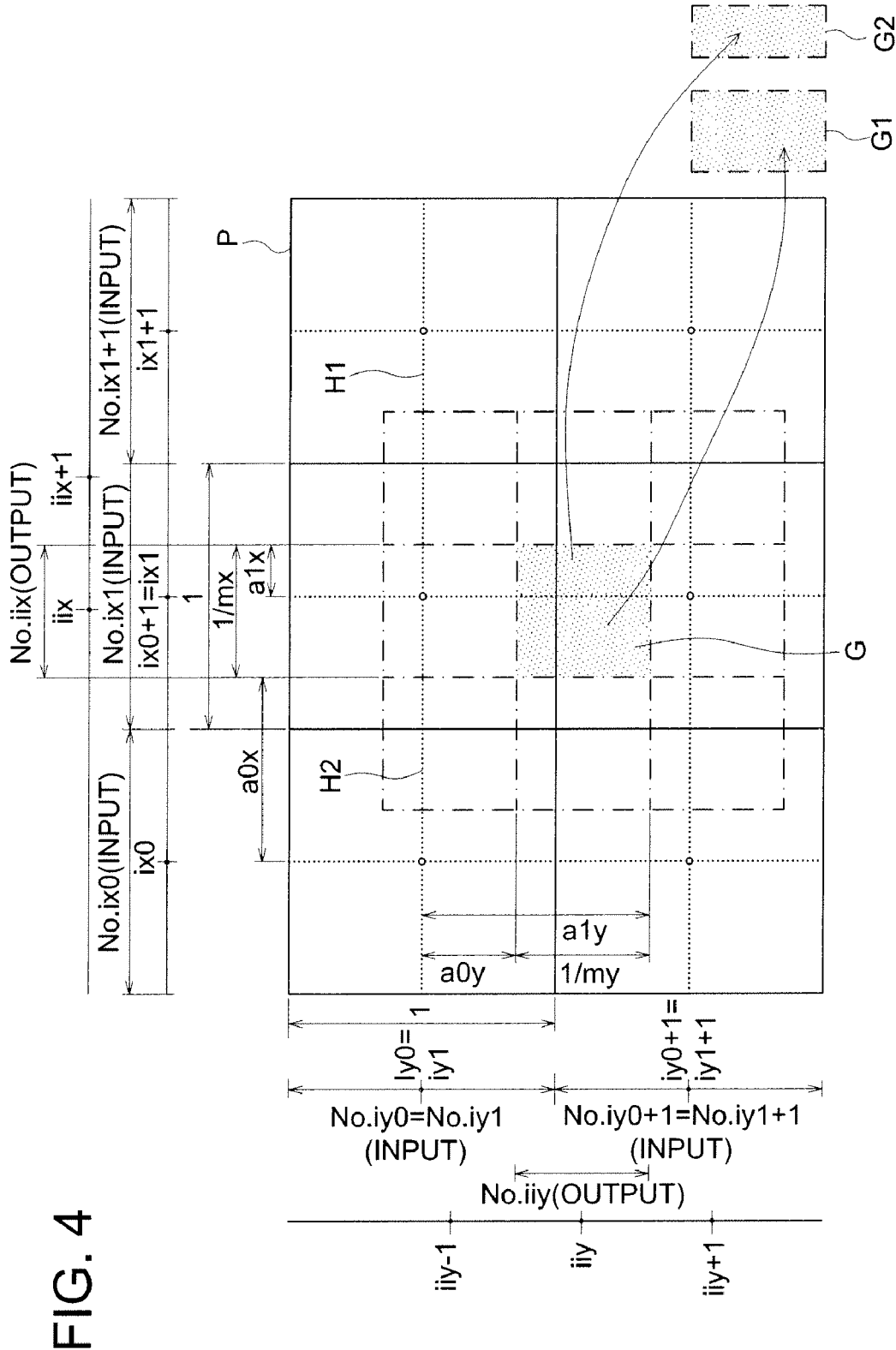
FIG. 4 shows an explanatory schematic diagram exemplifying a relationship between a pixel area included in an output image (an output pixel area) and a pixel area included in an input image (an input pixel area), when a high resolution processing (image size enlargement) is applied to the input image.

FIG. 4 shows a schematic diagram exemplifying a relationship between a pixel area included in the output image (an output pixel area) and a pixel area included in the input image (an input pixel area), when a high resolution processing (image size enlargement) is applied to the input image. The schematic diagram shown in FIG. 4 illustrates a partial area in the vicinity of a specific pixel (iix, iiy) included in the output image, in such a state that the input image and the output image are superimposed with each other, according to the settings employed in configurations shown in FIG. 16 and FIG. 17, so as to make the center positions of pixel areas positioned at the four corners of the input image and those of the output image respectively coincide with each other by applying a suitable scaling operation. In this connection, the unit of dimension indicated in FIG. 4 is indicated in reference to the input pixel pitch (input pixel pitch=1).

In FIG. 4, each of the rectangles depicted with the solid lines indicates a pixel area included in the input image (an input pixel area P), and a small-sized white circle residing at a center of each of the input pixel areas P indicates a coordinate of an input pixel (a representative coordinate position or pixel position). The pixel data is deemed as the values at the representative coordinate position abovementioned. Each of the rectangular areas, which is surrounded by broken lines and includes the adjacent four input pixels positioned at its apexes, is established as a single interpolation area.

An output pixel area G of the output pixel (iix, iiy) is defined as the area, which is surrounded by the alternate long and short dash lines, and is filled with the tiny dots, as shown in FIG. 4. The output pixel area G of the output pixel (iix, iiy) partially occupies both the interpolation area H1 and the interpolation area H2 crosswise in the horizontal direction (x direction). On the other hand, the output pixel areas G is included in the single interpolation area in the vertical direction (a part of output pixel area G, belonging to the interpolation area H1 in the horizontal direction, is only included in the interpolation area H1 in the vertical direction, while another part of output pixel area G, belonging to the interpolation area H2 in the horizontal direction, is only included in the interpolation area H2 in the vertical direction).

Figure 5:
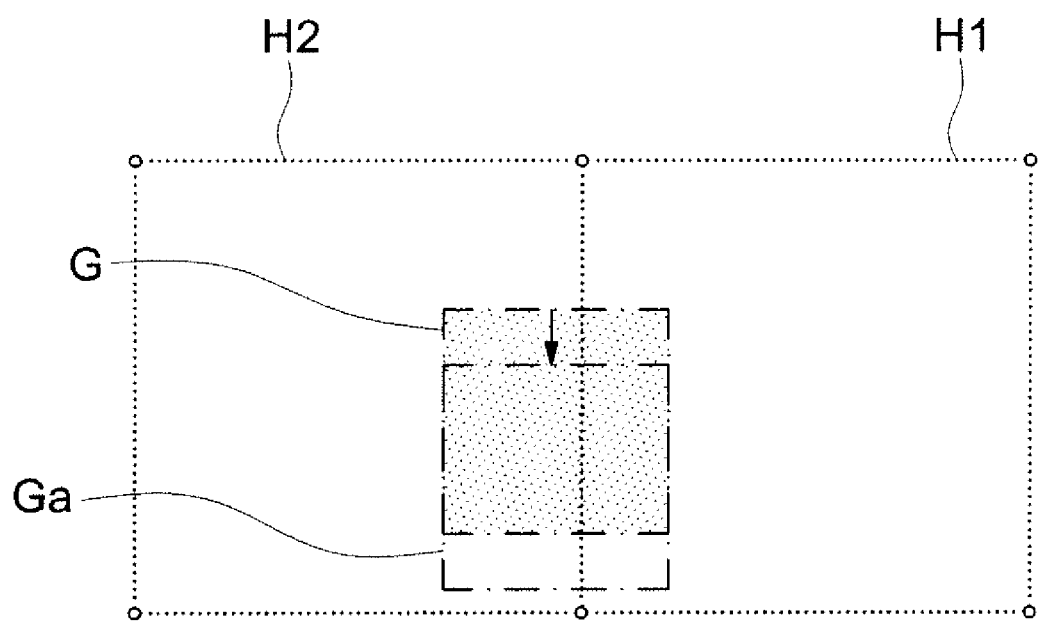
FIG. 5 shows an explanatory schematic diagram extracted from the schematic diagram shown in FIG. 4, in order to represent a shifting operation.

Accordingly, to achieve the adjustment, the output pixel area G is shifted in vertical direction so as to make the output pixel area G depart from the center of the interpolation area in which the output pixel area G is currently included. FIG. 5 shows another schematic diagram extracted from the schematic diagram shown in FIG. 4, in order to represent the shifting operation abovementioned. An output pixel area Ga surrounded by alternate long and short dash bold-lines indicates the position of the output pixel area G after the shifting operation is completed. Concretely speaking, the output pixel area G has been sifted downward so as to make it depart from the center of the interpolation area in the vertical direction (in such the direction that it approaches nearer one of the side lines of the interpolation area in the vertical direction).

The operations for integrating the interpolation value for the output pixel area Ga of the shifted pixel area (iix, iiy) are conducted with respect to the area residing within the interpolation area H1 and the other area residing within the interpolation area H2, separately and respectively, and after that, the integration value for the output pixel area Ga is found as total sum of the above-found two integrated values. In this connection, the output pixel area crosses over a single interpolation area, or two or four interpolation areas, depending on its position.

As described in the foregoing, when the output pixel area is included in the single interpolation area, the position of the output pixel area is adjusted by shifting it, so as to make the output pixel area depart from the center of the interpolation area, and then, the operation for integrating the interpolation value is conducted. Accordingly, the output pixel area is shifted in a direction form a position at which the output pixel area equally receives influences of the adjacent pixels constituting the interpolation area (four adjacent pixels, in the case of the linear interpolation) to another position at which the output pixel area strongly receives an influence of any one of the input pixels. As a result, since the value (pixel density), derived by normalizing the integration value, approaches the threshold value at such a portion as the edge portion whose adjacent pixels equally include white pixels and black pixels half by half, it becomes possible to eliminate such a state that the determination whether the concerned pixel is binarized to white or black is liable to become unstable.

Figure 6:
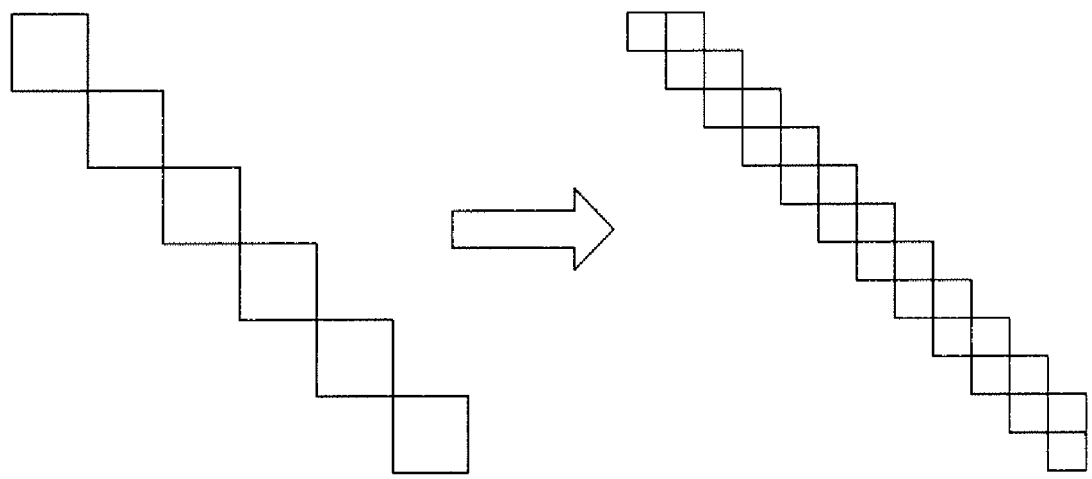
FIG. 6 shows an explanatory schematic diagram indicating diagonal lines before and after a resolution conversion processing embodied in the present invention is applied.

Further, even if the phase relationship between the input pixel and the output pixel varies depending on its position, since the adjusting operation (the operation for shifting the output pixel area) corresponding to the status of the position concerned (whether or not the output pixel area is included in the single interpolation area) is performed, it becomes possible to acquire a smoothed edge of a diagonal line or border without generating unevenness all over the image concerned, even when the size enlarging operation is conducted by employing a non-integer magnification factor. For instance, when the diagonal line is enlarged to two times of the input image in resolution, it becomes possible not only to obtain the smoothed edge of the diagonal line at any portion of the output image, but also to stably reproduce the thin line with a thickness corresponding to the original thickness, as shown in FIG. 6 (the right-side illustration).

Figure 7:
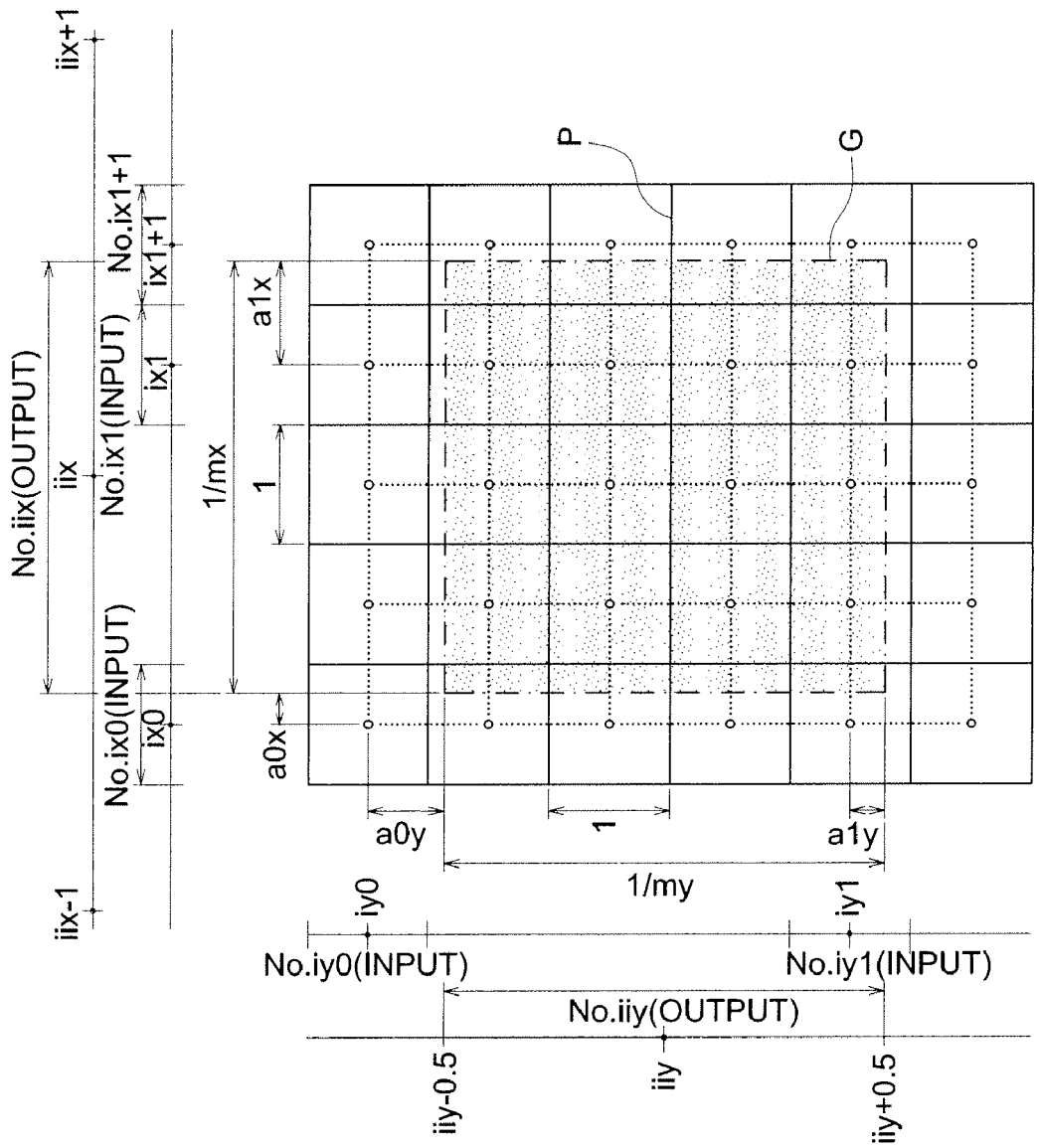
FIG. 7 shows an explanatory schematic diagram exemplifying a relationship between an output pixel area and an input pixel area, when a low resolution processing (image size reduction) is applied to an input image.

FIG. 7 shows a schematic diagram exemplifying a relationship between an output pixel area and an input pixel area, when a low resolution processing (image size reduction) is applied to the input image. The schematic diagram shown in FIG. 4 illustrates a partial area in the vicinity of a specific pixel (iix, iiy) included in the output image, in such a state that the input image and the output image are superimposed with each other according to the settings for making the center positions of pixel areas positioned at the four corners of the input image and those of the output image respectively coincide with each other by applying a suitable scaling operation. In this connection, the unit of dimension indicated in FIG. 7 is indicated in reference to the input pixel pitch (input pixel pitch=1).

In FIG. 7, each of the many rectangles depicted with the solid lines indicates a pixel area included in the input image (an input pixel area P), and a small-sized white circle residing at a center of each of the input pixel areas P indicates a coordinate of an input pixel (a representative coordinate position). The pixel data is deemed as the values at the representative coordinate position abovementioned. Each of the rectangular areas, which is surrounded by broken lines and includes the adjacent four input pixels positioned at its apexes, is established as a single interpolation area.

An output pixel area G of the output pixel (iix, iiy) is defined as the area, which is surrounded by the alternate long and short dash lines, and is filled with the tiny dots, as shown in FIG. 7. The output pixel area G crosses over 20 interpolation areas, and the integration value of interpolation value at the output pixel area G is found as a total sum of integration values derived from every interpolation area.

In this connection, when the image size reduction processing is conducted, the processing for shifting the output pixel area is not necessary with respect to a single output pixel area.

Second Embodiment

Next, second embodiment will be detailed in the following.

Figure 8:
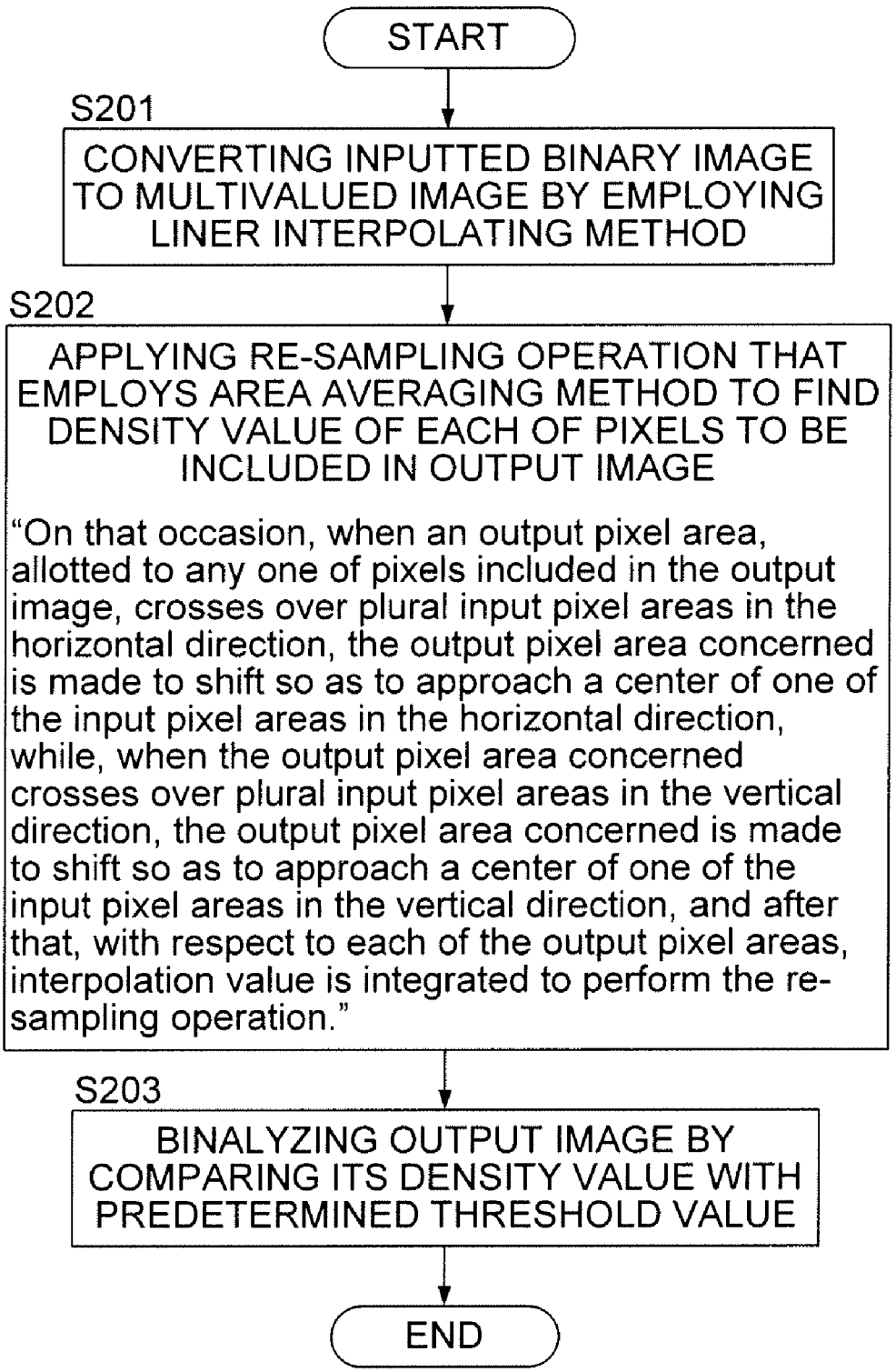
FIG. 8 shows a flowchart roughly indicating an overall processing flow of a resolution conversion method embodied in the present invention as the second embodiment.

FIG. 8 shows a flowchart roughly indicating an overall processing flow of the resolution conversion method embodied in the present invention as the second embodiment. Although the processing flow shown in FIG. 8 is fundamentally the same as that shown in FIG. 1, the processing flow shown in FIG. 8 is different from that indicated in FIG. 1 on the point that, when the output pixel area crosses over a plurality of input pixel areas P with respect to each of the horizontal direction and the vertical direction, an operation for integrating interpolation values is performed in Step S202 after the output pixel area is made to be shifted so that the concerned output pixel area approaches the center of a single input pixel area P. In this connection, the operation to be performed in Step S201 is the same as that in Step S101, and the operation to be performed in Step S203 is the same as that in Step S103.

Initially, a density value (interpolation value) at an arbitral position between pixels of the input image, serving as the inputted binary image represented in the dot-matrix format, is found by employing the liner interpolating method, so as to convert the inputted binary image to the multivalued image (Step S201).

Successively, a density value of each of the pixels to be included in the output image is found by applying the re-sampling operation that employs the area averaging method (Step S202). On that occasion, as indicated in the schematic diagrams shown in FIG. 16 and FIG. 17, the input image and the output image are superimposed (corresponded) with each other so as to make the center positions of pixel areas positioned at the four corners of the input image and those of the output image respectively coincide with each other, and then, the output image area, serving as the initial image area, is allotted to each of the pixels to be included in the output image. In this connection, as well as the first embodiment, the input image area is equally divided in advance into a plurality of input pixel areas P by the number of pixels included therein, so as to allot each of the input pixel areas P to each of the pixels included in the input image.

Still successively, when an output pixel area, allotted to any one of pixels included in the output image, crosses over plural input pixel areas in the horizontal direction, the output pixel area concerned is made to shift so as to approach a center of the nearest one of the input pixel areas in the horizontal direction. Further, when the output pixel area concerned crosses over plural input pixel areas in the vertical direction, the output pixel area concerned is made to shift so as to approach a center of the nearest one of the input pixel areas in the vertical direction. After that, with respect to each of the output pixel areas, interpolation value is integrated to perform the re-sampling operation.

Yet successively, each of the pixels included in the output image is binarized by comparing its density value, determined by the re-sampling operation performed in the above, with a predetermined threshold value so as to determine 0 or 1 corresponding to small or large (Step S203).

In this connection, even in the second embodiment, the calculating formula with respect to the liner interpolating operation (Equation (1)) and the other calculating formula for integrating the interpolation value within the rectangular area (Equation (2)) are also employed in the same manner as that in the first embodiment. Accordingly, explanations of them will be omitted.

Figure 9:
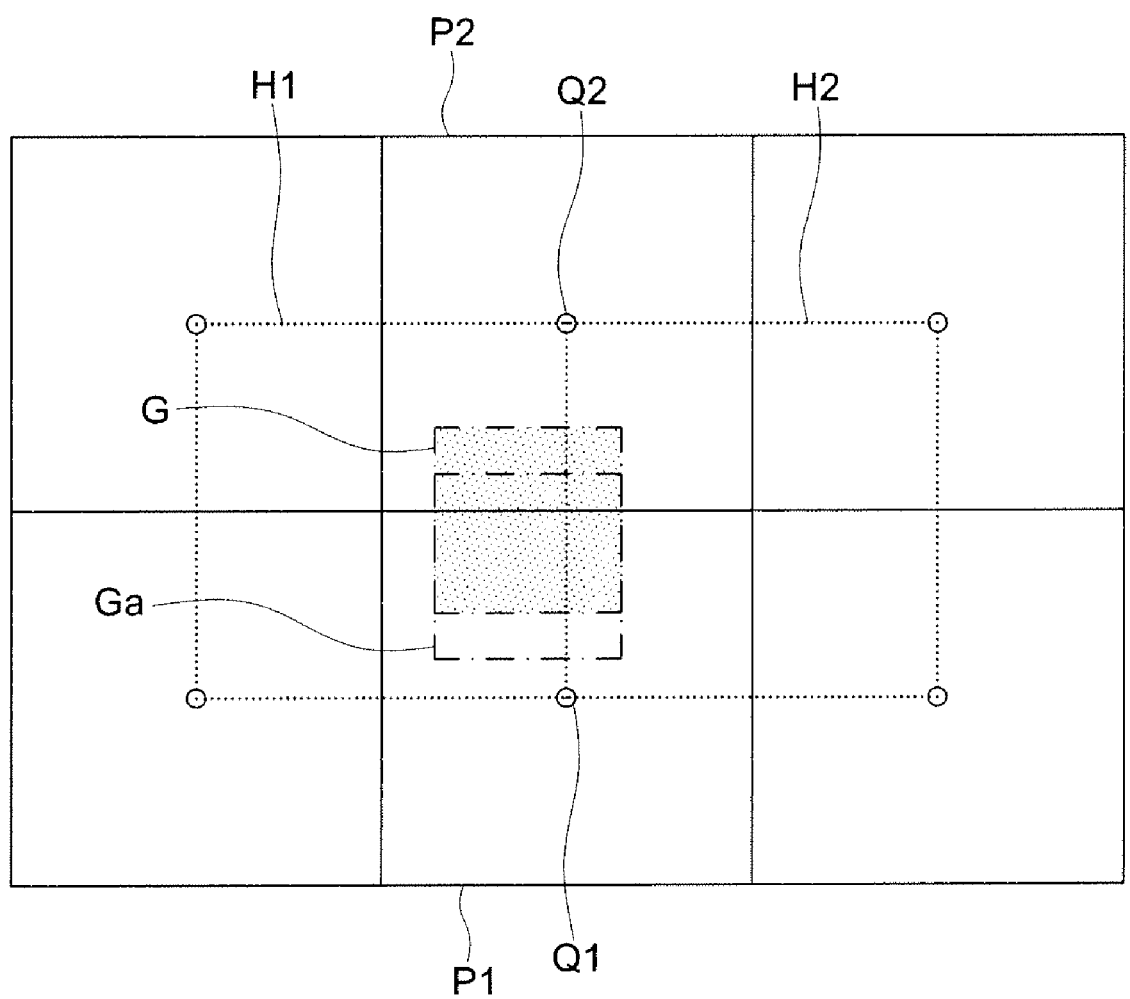
FIG. 9 shows an explanatory schematic diagram exemplifying an operation for shifting an output pixel area in the second embodiment.

Now, exemplifying the schematic diagram shown in FIG. 9, the operation for shifting an output pixel area, to be performed in the second embodiment, will be detailed in the following. As shown in FIG. 9, with respect to the vertical direction, the output pixel area G partially occupies both the input pixel area P1 and the input pixel area P2 crosswise. Accordingly, the output pixel area G is made to shift so as to approach a pixel position of an input pixel Q1, being nearest to the output pixel area G in the vertical direction, (a center of the input pixel area P1 being nearest to the output pixel area G). An output pixel area Ga, which is surrounded by the alternate long and short dash lines shown in FIG. 9, represents the position of the output pixel area G after shifted.

In the exemplary schematic diagram shown in FIG. 9, since, with respect to the horizontal direction, the output pixel area G is included in a single input pixel area (a part of output pixel area G, belonging to the input pixel area P1 in the vertical direction, is only included in the input pixel area P1 in the horizontal direction, while another part of output pixel area G, belonging to the input pixel area P2 in the vertical direction, is only included in the input pixel area P2 in the horizontal direction), the operation for shifting the output pixel area G in the horizontal direction is not performed.

The operations for integrating the interpolation value for the output pixel area Ga after shifted are conducted with respect to the area residing within the interpolation area H1 and the other area residing within the interpolation area H2, separately and respectively, and after that, the integration value for the output pixel area Ga is found as total sum of the above-found two integrated values.

Figure 10:
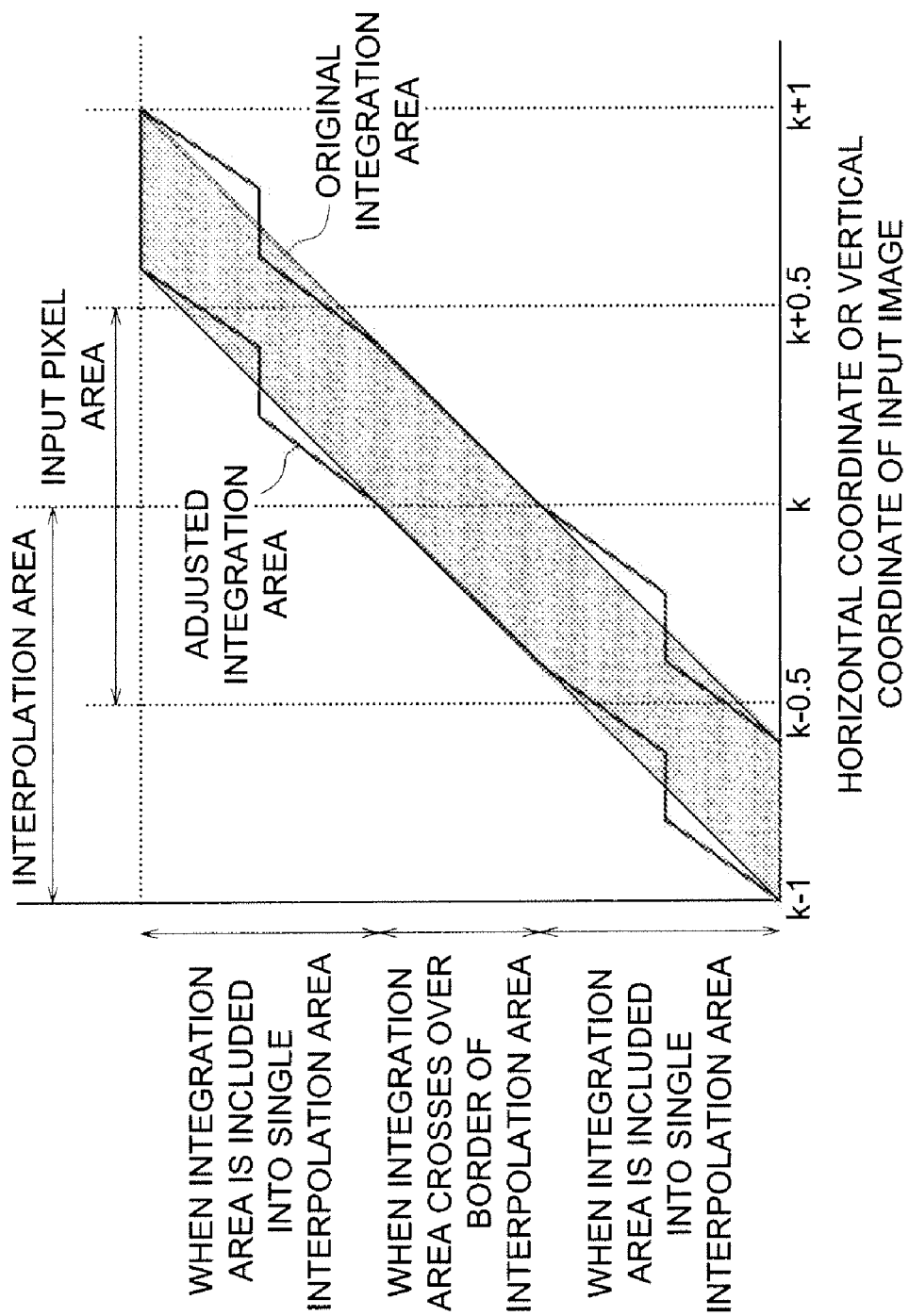
FIG. 10 shows a schematic diagram indicating an example of output pixel-area shift characteristics.
Figure 11:
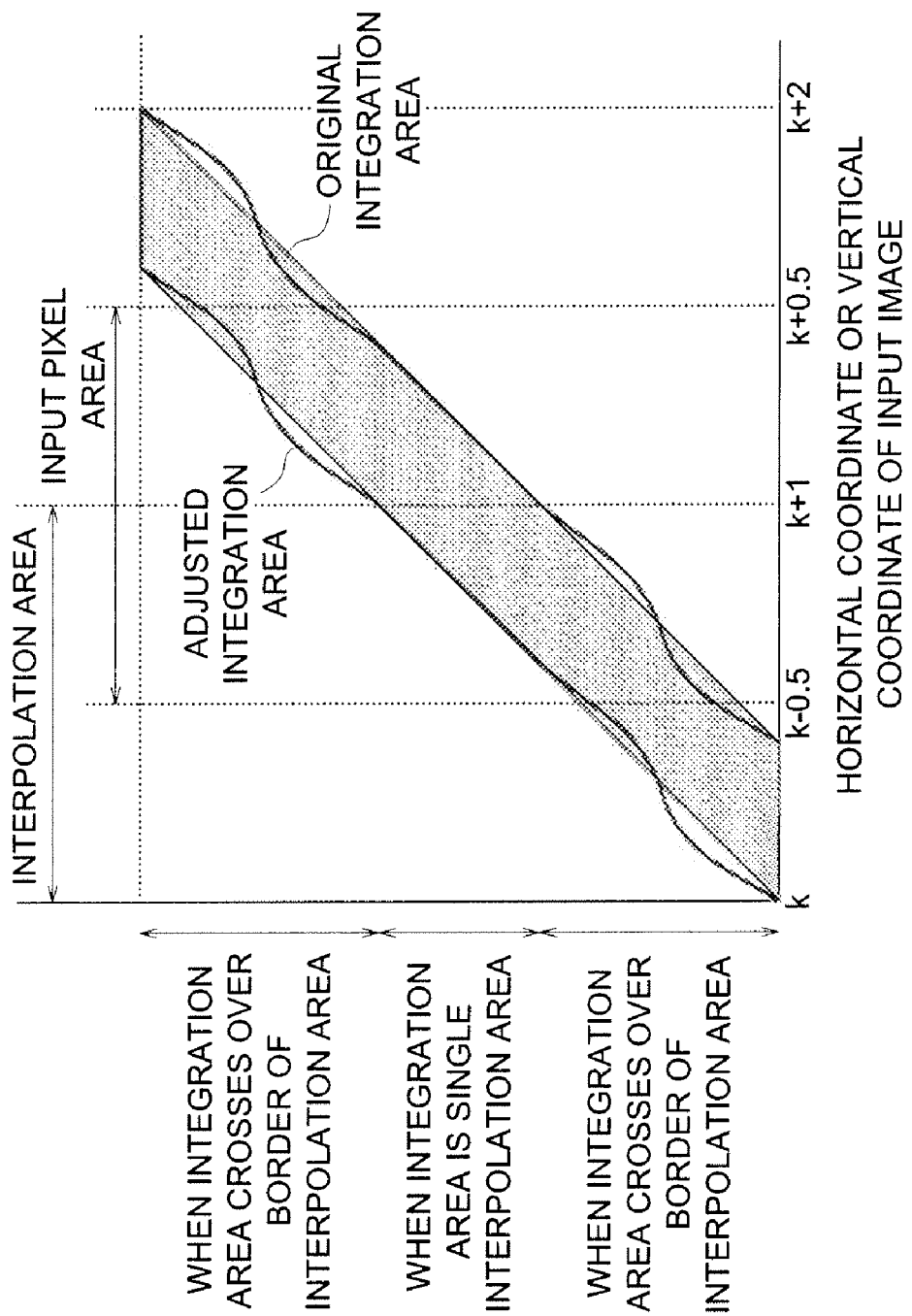
FIG. 11 shows another schematic diagram indicating another example of output pixel-area shift characteristics, in which a transition area is introduced.

FIG. 10 shows a schematic diagram indicating an example of output pixel-area shift characteristics. Further, FIG. 11 shows another schematic diagram indicating another example of output pixel-area shift characteristics, in which a transition area, for smoothing an intermediate area existing between an area to be shifted and another area not to be shifted, is introduced.

In this connection, the operations to be conducted at the time of performing the image size reduction are substantially the same as those in the first embodiment. Further, the scope of the relationship between the position, in regard to the output pixel area versus the input pixel area P, and the shifting operation is not limited to the schematic diagrams shown in FIG. 10 and FIG. 11. Still further, an arbitral characteristic is applicable for this purpose, as far as the characteristic is such that, when the output pixel area crosses over plural input pixel areas, the output pixel area G is made to shift towards the center of a specific one of the input pixel areas. Accordingly, it is possible to establish a suitable characteristic as needed.

As described in the foregoing, when the output pixel area crosses over plural input pixel areas, since the operation for integrating the interpolation value is performed after the output pixel area is made to shift so as to approach the center (pixel position) of any one of the plural input pixel areas concerned (preferably, the nearest one in its crossover direction), the output pixel area is shifted in a direction form a position at which the output pixel area equally receives influences of the adjacent pixels constituting the interpolation area (four adjacent pixels, in the case of the linear interpolation) to another position at which the output pixel area strongly receives an influence of any one of the input pixels. As a result, since the value (pixel density), derived by normalizing the integration value, approaches the threshold value at such a portion as the edge portion whose adjacent pixels equally include white pixels and black pixels half by half, it becomes possible to eliminate such a state that the determination whether the concerned pixel is binarized to white or black is liable to become unstable.

Further, even if the phase relationship between the input pixel and the output pixel varies depending on its position, since the adjusting operation (the operation for shifting the output pixel area) corresponding to the status of the position concerned (whether or not the output pixel area is included in the plural input pixel areas) is performed, it becomes possible to acquire a smoothed edge of a diagonal line or border without generating unevenness all over the image concerned, even when the size enlarging operation is conducted by employing a non-integer magnification factor.

Third Embodiment

Next, the third embodiment will be detailed in the following.

Figure 21:
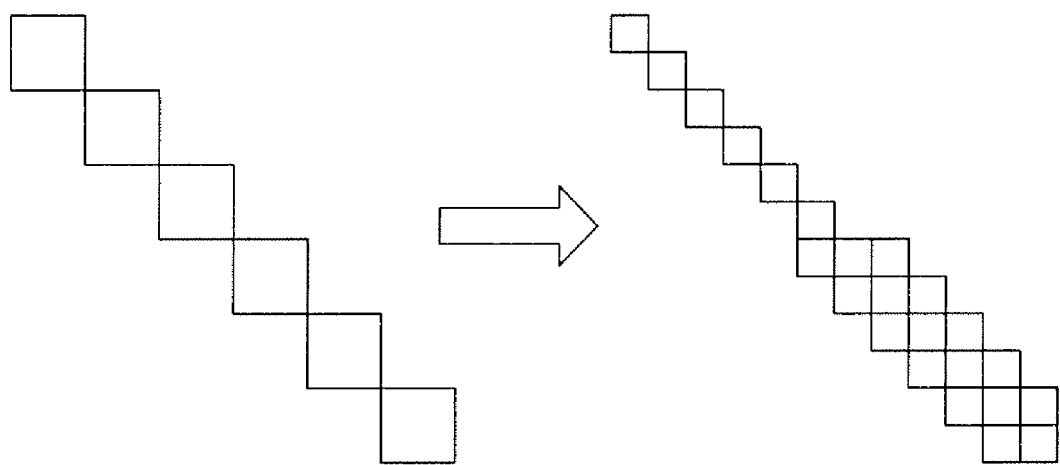
FIG. 21 shows an explanatory schematic diagram exemplifying diagonal lines before and after a resolution of a diagonal is approximately doubled in a phase relationship shown in FIG. 19.

According to the third embodiment, it becomes possible to cope with the resolution conversion processing, which employs an integer magnification factor, more appropriately than ever. In each of the first and second embodiments, as indicated in the schematic diagram shown in FIG. 17, the input image and the output image are superimposed (corresponded) with each other so as to make the center positions of pixel areas positioned at the four corners of the input image and those of the output image respectively coincide with each other. If the high-resolution conversion processing, which employs an integer magnification factor, is applied to the input image in the abovementioned mode, and for instance, if the integer magnification factor is set at two times of the input image, the phase relationships shown in FIG. 19 emerge all over the output image, resulting in a tendency to generate the thickness instability (or unevenness) of the diagonal line as shown in FIG. 21.

To overcome such the problem as abovementioned, in the third embodiment, the input image and the output image are made to superimpose with each other in such a manner (setting) that the center positions of pixel areas positioned at the four corners of the input image and those of the output image are respectively shifted from each other by a minutely small distance. The other operations are the same as those to be performed in each of the first and second embodiments.

Figure 12:
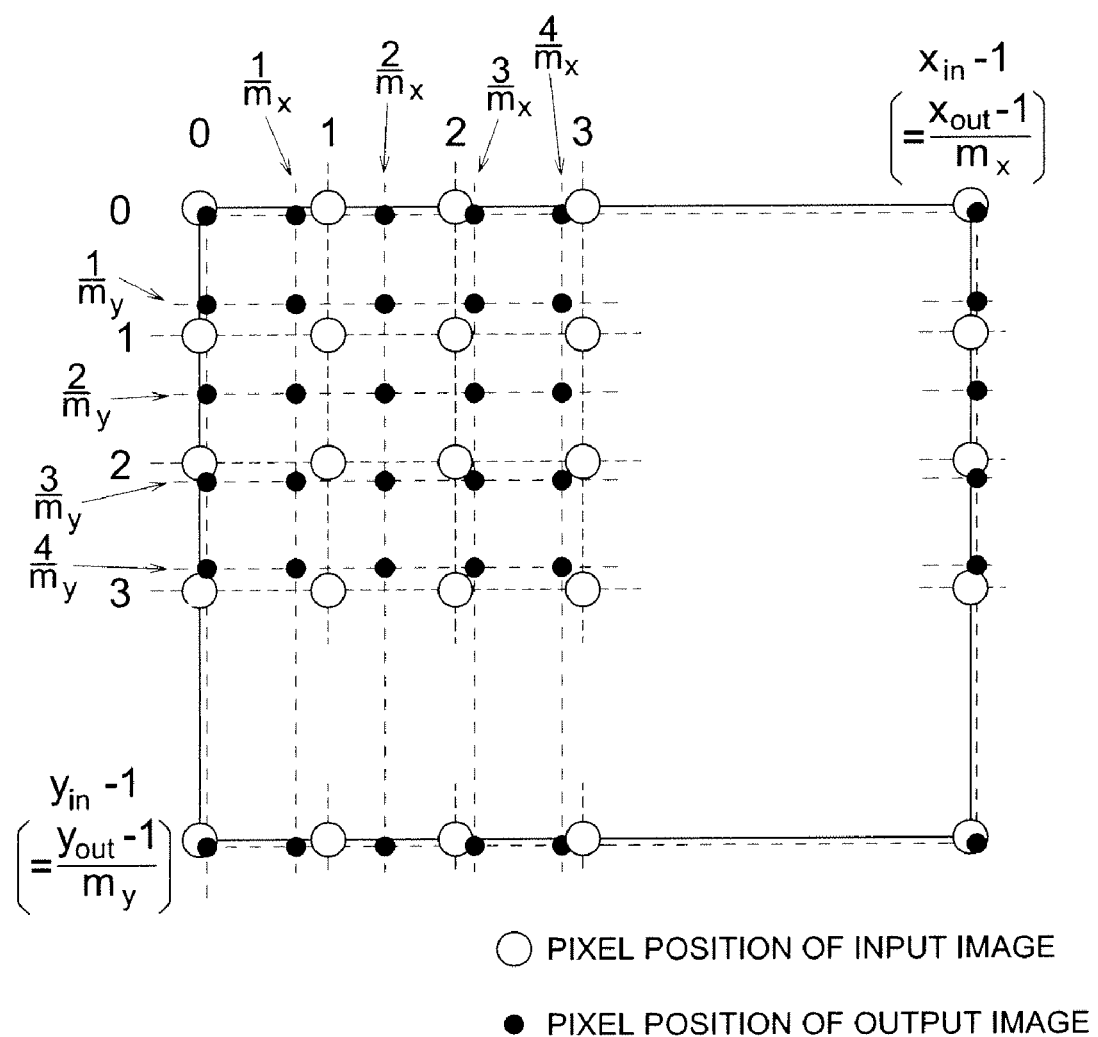
FIG. 12 shows an explanatory schematic diagram indicating an exemplary status in which an input image and an output image are made to overlap each other in such a manner that center positions of pixel areas positioned at four corners of the input image and those of the output image are respectively shifted in both a horizontal direction and a vertical direction from each other by a minutely small distance.

FIG. 12 shows a schematic diagram indicating an exemplary status in which the input image and the output image are made to overlap each other in such a manner (setting) that the center positions of pixel areas positioned at the four corners of the input image and those of the output image are respectively shifted in both the horizontal direction and the vertical direction from each other by a minutely small distance.

In order to maintain the correspondence relationship between the four corners of the input image and those of the output image, it is undesirable that the shifting amount is excessively great. On the ground that the pixels, onto which the pixels positioned at the four corners of the input image are mainly reflected, are to be remained, an upper limit of the shifting amount is set at such a value that is smaller than ½ (half) for the pitch of the output pixels and is smaller than ½m (m: magnification factor) for the pitch of the input pixels (smaller than 0.25 pixel when two times enlargement, smaller than 0.125 pixel when four times enlargement, etc.). In the system in which the enlargement of around four times is set at its upper limit, it is sufficient to set the shifting amount at a value being equal to or smaller than 0.1 pixel. On the other hand, it is unnecessary to specifically consider the lower limit of the shifting amount. Any slightly value is applicable as the shifting amount.

Figure 13:
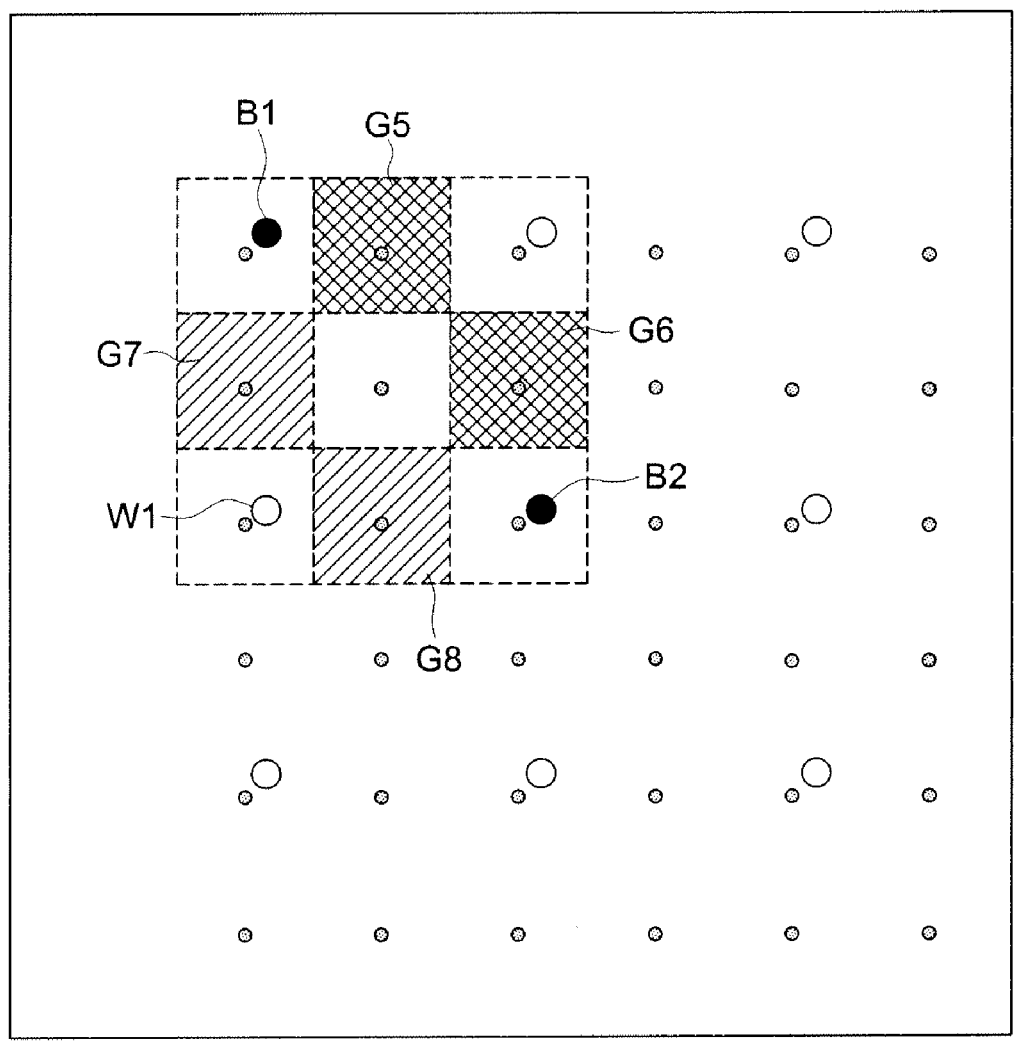
FIG. 13 shows an explanatory schematic diagram indicating relationship between input pixels and output pixels, when an output image is enlarged to twice of an input image in such a manner that center positions of pixel areas positioned at four corners of the input image and those of the output image, after a resolution conversion processing is completed, are respectively shifted from each other in both horizontal direction and vertical directions by a minutely small distance.
Figure 14:
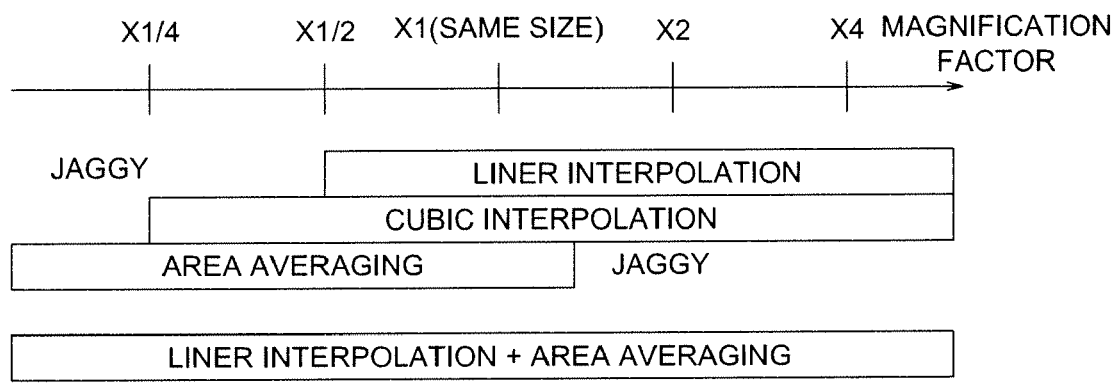
FIG. 14 shows an explanatory schematic diagram indicating appropriate application ranges of the liner interpolating method, the area averaging method, etc.

FIG. 13 shows an exemplary schematic diagram indicating relationship between the input pixels and the output pixels, when the output image is enlarged to twice of the input image in such a manner (setting) that the center positions of pixel areas positioned at the four corners of the input image and those of the output image after the resolution conversion processing is completed are respectively shifted from each other in both the horizontal direction and the vertical direction by a minutely small distance. The schematic diagram shown in FIG. 13 is indicated in such a manner that it is possible to confront it with the other schematic diagram shown in FIG. 19 in which the output image is enlarged to twice of the input image based on the setting that the center positions of pixel areas positioned at the four corners of the input image and those of the output image coincide with each other.

Figure 19:
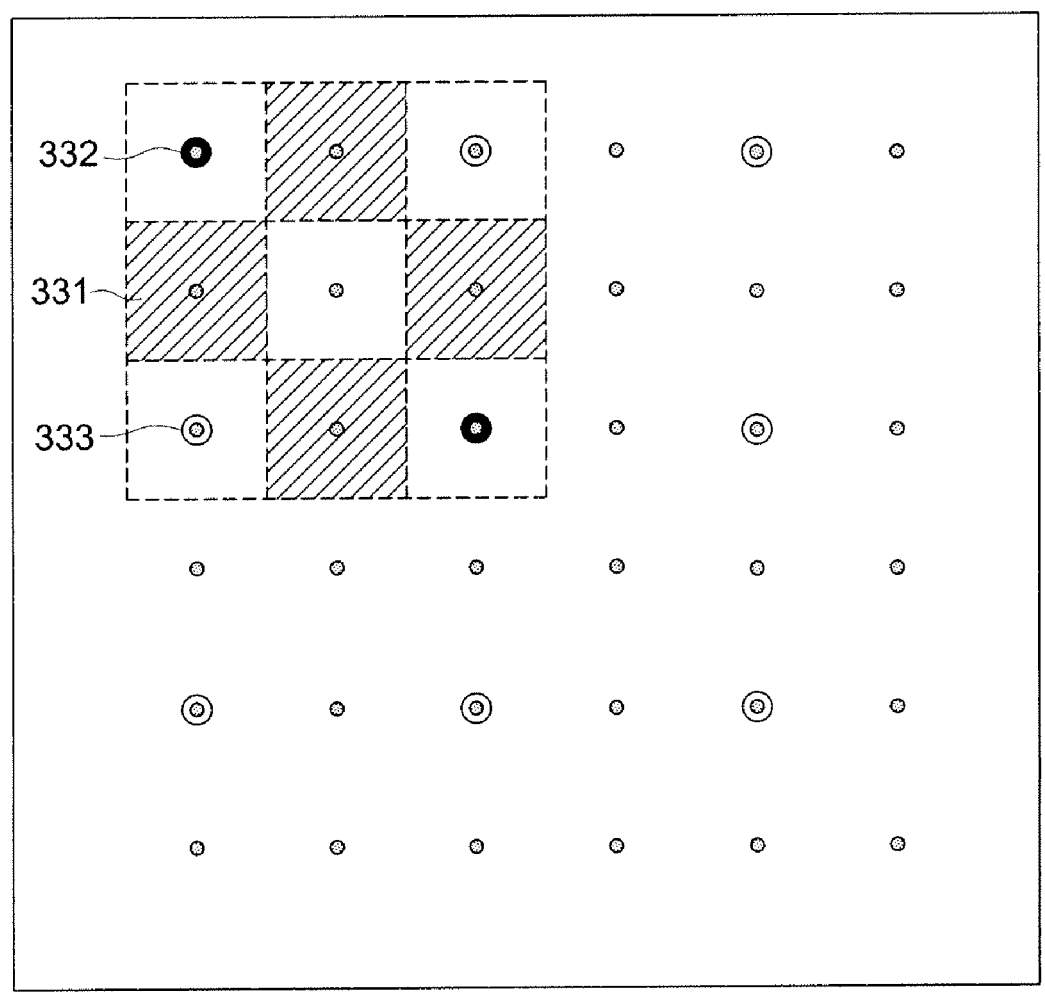
FIG. 19 shows an explanatory schematic diagram indicating another phase relationship between input pixels and output pixels, when the magnification factor of 205%, which is slightly shifted from a double size of an input image, is employed for multiplying a resolution.
Figure 20:
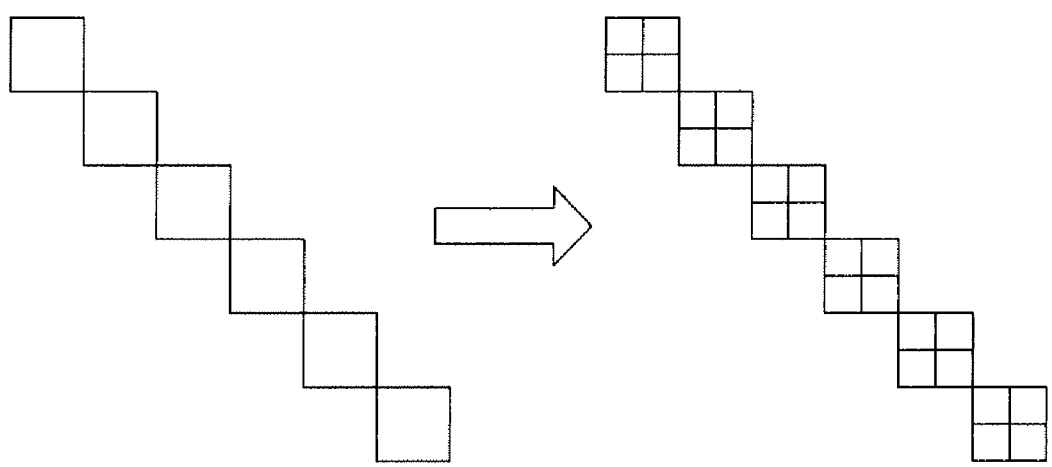
FIG. 20 shows an explanatory schematic diagram exemplifying diagonal lines before and after a resolution of a diagonal is approximately doubled in a phase relationship shown in FIG. 18.

In the schematic diagram shown in FIG. 19, since the integration value of the other pixel area, to which hatched lines are applied, is uniformly influenced by the peripheral input pixels without depending on the specific input pixel, the density value derived by normalizing the integration value has been liable to approach the threshold value, and as a result, when performing the binarizing processing, the operation for determining whether the concerned pixel area is made to be white or black has been liable to become unstable. However, according to the third embodiment of the present invention, by shifting the center positions of pixel areas of the input image and the output image from each other by a minutely small distance, the output pixel areas G5 and G6 are more strongly influenced by the black input pixels B1 and B2, compared to the white input pixels W, and as a result, when performing the binarizing processing, the output pixel areas G5 and G6 are determined as black pixels. On the other hand, since the output pixel areas G7 and G8 are more strongly influenced by the white input pixels W1 and W2, compared to the black input pixels B, when performing the binarizing processing, the output pixel areas G7 and G8 are determined as white pixels, though determination of a black or white pixel has been unstable when performing the binarizing processing without shifting them form each other by the minutely small distance.

As a result, when enlarging the diagonal line so as to double the resolution, it becomes possible not only to obtain the smoothed diagonal edge as shown in FIG. 6 (right side), but also to stably reproduce a thin line having a appropriate thickness corresponding to its original thickness. Further, the correspondence relationship between an edge portion of the input image and a reproduced edge portion of the output image can be substantially maintained.

Referring to the drawings, various kinds of the preferred embodiments have been described in the foregoing. However, the scope of the concrete structure embodied in the present invention is not limited to the aforementioned embodiments. Any kinds of modifications and additions made by a skilled person without departing from the spirit and scope of the present invention shall be included in the scope of the present invention.

For instance, although the interpolation values to be used in the aforementioned embodiments have been found by employing the liner interpolating method, the method for finding the interpolation values is not limited to the liner interpolating method. Any other applicable method can be employed for this purpose. For instance, the cubic convolution method may be employed for this purpose.

According to the resolution conversion method embodied in the present invention, when the high-resolution conversion processing is applied to a binary image represented in the dot-matrix format, it becomes possible not only to acquire a diagonal edge image that is fairly smoothed, but also to stably reproduce a thin line having a thickness corresponding to its original thickness.

While the preferred embodiments of the present invention have been described using specific term, such description is for illustrative purpose only, and it is to be understood that changes and variations may be made without departing from the spirit and scope of the appended claims.

What is claimed is:

1. A resolution conversion method for converting a resolution of an input image, which is a binary image represented in a dot-matrix format, comprising:
representing a density at a specific point, located at an arbitral position residing between pixels included in the input image, as an interpolation value of an adjacent pixel located adjacent to the specific point within the input image;
allotting an output pixel area, which serves as a pixel area of each of output pixels to be included in an output image acquired after a resolution conversion processing is completed, to each of the output pixels in such a state that the input image and the output image are superimposed with each other so that four corners of the input image and those of the output image respectively correspond to each other; and
determining binary data of each of the output pixels by comparing a normalized value that is acquired by normalizing a value derived by integrating the interpolation value with respect to an area of an input pixel, which is superimposed with the output pixel area, in reference to the output pixel area, wherein the determining binary data comprises determining a binary value of small when a density of a corresponding pixel of the output pixels is less than a predetermined threshold value and determining a binary value of large when the density of the corresponding pixel is greater than the predetermined threshold value;
wherein an operation for integrating the interpolation value with respect to the area of the input pixel is implemented after:
when the output pixel area is included in a single interpolation area in a horizontal direction, the output pixel area is shifted in the horizontal direction so as to make the output pixel area depart from a center of the interpolation area; and
when the output pixel area is included in a single interpolation area in a vertical direction, the output pixel area is shifted in the vertical direction so as to make the output pixel area depart from a center of the interpolation area.

2. The resolution conversion method of claim 1,
wherein the input image and the output image are superimposed with each other in such a manner that a center of a pixel area of a pixel positioned at an edge portion of the output image is shifted in both the horizontal direction and the vertical direction from that of the input image.

3. The resolution conversion method of claim 2,
wherein a distance that the center of the pixel area is shifted in both the horizontal direction and the vertical direction is set at a value that is smaller than a half of a pitch of pixels included in the output image.

4. A resolution conversion method for converting a resolution of an input image, which is a binary image represented in a dot-matrix format, comprising:
representing a density at a specific point, located at an arbitral position residing between pixels included in the input image, as an interpolation value of an adjacent pixel located adjacent to the specific point within the input image;
establishing input pixel areas at centers of which input pixels included in the input image are positioned, respectively;
allotting an output pixel area, which serves as a pixel area of each of output pixels to be included in an output image acquired after a resolution conversion processing is completed, to each of the output pixels in such a state that the input image and the output image are superimposed with each other so that four corners of the input image and those of the output image respectively correspond to each other; and
determining binary data of each of the output pixels by comparing a normalized value that is acquired by normalizing a value derived by integrating the interpolation value with respect to an area of an input pixel, which is superimposed with the output pixel area, in reference to the output pixel area, wherein the determining binary data comprises determining a binary value of small when a density of a corresponding pixel of the output pixels is less than a predetermined threshold value and determining a binary value of large when the density of the corresponding pixel is greater than the predetermined threshold value;
wherein an operation for integrating the interpolation value with respect to the area of the input pixel is implemented after:
when the output pixel area crosses over plural input pixel areas in a horizontal direction, the output pixel area is shifted in the horizontal direction so as to make the output pixel area approach one of the centers of the input pixel areas; and
when the output pixel area crosses over plural input pixel areas in a vertical direction, the output pixel area is shifted in the vertical direction so as to make the output pixel area approach one of the centers of the input pixel areas.

5. The resolution conversion method of claim 4,
wherein the input image and the output image are superimposed with each other in such a manner that a center of a pixel area of a pixel positioned at an edge portion of the output image is shifted in both the horizontal direction and the vertical direction from that of the input image.

6. The resolution conversion method of claim 5,
wherein a distance that the center of the pixel area is shifted in both the horizontal direction and the vertical direction is set at a value that is smaller than a half of a pitch of pixels included in the output image.

7. A non-transitory computer readable storage medium storing a computer executable program for implementing an operation for converting a resolution of an input image, which is a binary image represented in a dot-matrix format, the program being executable by a computer to cause the computer to perform a process comprising:
representing a density at a specific point, located at an arbitral position residing between pixels included in the input image, as an interpolation value of an adjacent pixel located adjacent to the specific point within the input image;
allotting an output pixel area, which serves as a pixel area of each of output pixels to be included in an output image acquired after a resolution conversion processing is completed, to each of the output pixels in such a state that the input image and the output image are superimposed with each other so that four corners of the input image and those of the output image respectively correspond to each other; and
determining binary data of each of the output pixels by comparing a normalized value that is acquired by normalizing a value derived by integrating the interpolation value with respect to an area of an input pixel, which is superimposed with the output pixel area, in reference to the output pixel area, wherein the determining binary data comprises determining a binary value of small when a density of a corresponding pixel of the output pixels is less than a predetermined threshold value and determining a binary value of large when the density of the corresponding pixel is greater than the predetermined threshold value;

wherein an operation for integrating the interpolation value with respect to the area of the input pixel is implemented after:

when the output pixel area is included in a single interpolation area in a horizontal direction, the output pixel area is shifted in the horizontal direction so as to make the output pixel area depart from a center of the interpolation area; and when the output pixel area is included in a single interpolation area in a vertical direction, the output pixel area is shifted in the vertical direction so as to make the output pixel area depart from a center of the interpolation area.

8. The non-transitory computer readable storage medium of claim 7, wherein the input image and the output image are superimposed with each other in such a manner that a center of a pixel area of a pixel positioned at an edge portion of the output image is shifted in both the horizontal direction and the vertical direction from that of the input image.

9. The non-transitory computer readable storage medium of claim 8, wherein a distance that the center of the pixel area is shifted in both the horizontal direction and the vertical direction is set at a value that is smaller than a half of a pitch of pixels included in the output image.

10. A non-transitory computer readable storage medium storing a computer executable program for implementing an operation for converting a resolution of an input image, which is a binary image represented in a dot-matrix format, the program being executable by a computer to cause the computer to perform a process comprising:

representing a density at a specific point, located at an arbitral position residing between pixels included in the input image, as an interpolation value of an adjacent pixel located adjacent to the specific point within the input image;

establishing input pixel areas at centers of which input pixels included in the input image are positioned, respectively;

allotting an output pixel area, which serves as a pixel area of each of output pixels to be included in an output image acquired after a resolution conversion processing is completed, to each of the output pixels in such a state that the input image and the output image are superimposed with each other so that four corners of the input image and those of the output image respectively correspond to each other; and determining binary data of each of the output pixels by comparing a normalized value that is acquired by normalizing a value derived by integrating the interpolation value with respect to an area of an input pixel, which is superimposed with the output pixel area, in reference to the output pixel area, wherein the determining binary data comprises determining a binary value of small when a density of a corresponding pixel of the output pixels is less than a predetermined threshold value and determining a binary value of large when the density of the corresponding pixel is greater than the predetermined threshold value;

wherein an operation for integrating the interpolation value with respect to the area of the input pixel is implemented after:

when the output pixel area crosses over plural input pixel areas in a horizontal direction, the output pixel area is shifted in the horizontal direction so as to make the output pixel area approach one of the centers of the input pixel areas; and when the output pixel area crosses over plural input pixel areas in a vertical direction, the output pixel area is shifted in the vertical direction so as to make the output pixel area approach one of the centers of the input pixel areas.

11. The non-transitory computer readable storage medium of claim 10, wherein the input image and the output image are superimposed with each other in such a manner that a center of a pixel area of a pixel positioned at an edge portion of the output image is shifted in both the horizontal direction and the vertical direction from that of the input image.

12. The non-transitory computer readable storage medium of claim 11, wherein a distance that the center of the pixel area is shifted in both the horizontal direction and the vertical direction is set at a value that is smaller than a half of a pitch of pixels included in the output image.

* * * * *